United States Patent [19]

Ramachandran et al.

[11] Patent Number: 6,023,688
[45] Date of Patent: Feb. 8, 2000

[54] TRANSACTION APPARATUS AND METHOD THAT IDENTIFIES AN AUTHORIZED USER BY APPEARANCE AND VOICE

[75] Inventors: Natarajan Ramachandran, Uniontown; Roy Mleziva; Jeffrey A. Hill, both of Canton, all of Ohio

[73] Assignee: Diebold, Incorporated, North Canton, Ohio

[21] Appl. No.: 09/037,559

[22] Filed: Mar. 9, 1998

Related U.S. Application Data

[60] Provisional application No. 60/067,316, Nov. 28, 1997.

[51] Int. Cl.$^7$ ..................................................... G06F 19/00
[52] U.S. Cl. ............................... 705/44; 705/40; 705/43; 705/45; 380/24
[58] Field of Search ................................. 705/43, 40, 10, 705/41, 26, 42, 45, 44, 17; 702/76, 108; 324/76.41; 395/200.34, 200.35, 200.68, 200.79; 380/24–25, 4

[56] References Cited

U.S. PATENT DOCUMENTS

| | | | |
|---|---|---|---|
| 4,990,848 | 2/1991 | So | 702/76 |
| 5,331,544 | 7/1994 | Lu et al. | 705/10 |
| 5,497,314 | 3/1996 | Novak | 705/17 |
| 5,557,518 | 9/1996 | Rosen | 705/17 |
| 5,592,377 | 1/1997 | Lipken | 705/42 |
| 5,644,727 | 7/1997 | Atkins | 705/40 |
| 5,832,464 | 11/1998 | Houvener et al. | 705/45 |
| 5,844,327 | 12/1998 | Batson | 307/64 |
| 5,878,139 | 3/1999 | Rosen | 705/24 |

OTHER PUBLICATIONS

Belsie, "Coming soon: ATMs that recognize your eyes", Christian Science Monitor, 13:4, Dec. 2, 1997.
Hotchkiss, "Brickless banking", Bank Marketing, vol. 29, Issue 1, pp. 36–37, Jan. 1997.
Borthick, "NGN—closeup on the big picture", Business Communications Review, vol. 27, Issue 12, p. 6, Dec. 1997.

*Primary Examiner*—James P. Trammell
*Assistant Examiner*—Cuong H. Nguyen
*Attorney, Agent, or Firm*—Ralph E. Jocke; Daniel D. Wasil

[57] ABSTRACT

A financial transaction apparatus (30) includes a financial transaction machine (32). The machine includes devices (34) including transaction function devices (42, 44, 46, 48) for carrying out operations associated with financial transactions. The terminal also includes an imaging device (50) and an audio input device (52), as well as a visual output device (36) and an audio output device (54). Terminal (32) is connected to a computer (68) which has an associated data store (70). The data store includes user data including image data and voice data corresponding to authorized users. The identity of a customer operating the machine is determined by resolving first identity data based on image signals from the imaging device which correspond to a user's appearance. Second identity data is resolved by the processor from voice signals from the audio input device corresponding to the user's voice. The computer enables operation of the transaction function devices if the level of correlation between the first and second identity data is sufficient to establish that the image and voice signals originate from a single authorized user.

36 Claims, 16 Drawing Sheets

FIG. 16

.Wav files

1. Welcome!
2. Please state your pass-phrase.
3. Identification verified.
4. We know you like rock & jazz music.
5. We know you like rock & country music.
6. We know you like rock & classical music.
7. We know you like jazz & country music.
8. We know you like jazz & classical music.
9. We know you like classical & country music.
10. Tickets are still available for these upcoming concerts.
11. Would you like to buy tickets for either of these concerts now?
12. Please state the name of the concert you would like.
13. Tickets are $40 each. How many would you like?
14. Would you like to pay from your debit or credit account?
15. Thank you. Enjoy the video while your tickets are being printed.
16. Enjoy the concert.
17. Please take your tickets.
18. Thank you visiting the Diebold concept terminal.
19. Please repeat.
20. I'm sorry, your response was not understood.

TRANSACTION APPARATUS AND METHOD THAT IDENTIFIES AN AUTHORIZED USER BY APPEARANCE AND VOICE

This application claims the benefit of U.S. Provisional Application Ser. No. 60/067,316 filed on Nov. 28, 1997.

TECHNICAL FIELD

This invention relates to devices and systems for carrying out financial transactions. Specifically this invention relates to a financial transaction apparatus that identifies an authorized user based on a user's appearance and voice.

BACKGROUND ART

Financial transaction systems are known in the prior art. A common type of financial transaction system includes automated teller machines (ATMs). ATMs may be used to conduct banking transactions such as a withdrawal of funds from an account, a transfer of funds between accounts, a deposit into an account, an account balance inquiry and other types of transactions depending on the capabilities of the ATM.

Financial transaction terminals including ATMs, have also been equipped with the capabilities of dispensing items of value other than cash. Such items have included travelers checks, scrip, tickets, stamps and vouchers.

In the past, customers have conventionally identified themselves to ATMs and other financial transaction machines using a card. The card has data encoded thereon which is representative of the user and/or their account number. Enhanced security is achieved by the ATM reading the data from the card and then further requiring the input of a personal identification number (PIN) which uniquely corresponds to the data referenced by the data encoded on the card. If the PIN and card data correspond the ATM enables the user to further operate the machine to conduct transactions.

Cards which include an integrated circuit chip thereon have been developed. These so called "smart cards" have information concerning the user and/or their accounts on the chip. The chip may further have the capability of verifying proper correspondence between the data stored on the card and a PIN number input by a customer at a financial transaction terminal. Data representative of cash value may also be stored on the chip. While smart cards may provide additional functions and heightened security, their operation in connection with a financial transaction machine is generally similar to cards which have data encoded on a magnetic stripe or through other means.

In recent years, it has been suggested that means other than encoded card and PIN data be used to identify a proper user of a financial transaction machine. Other means which have been suggested include the use of finger print reading technology, whereby a user's finger prints may be read electronically to identify them as a proper user. This approach has drawbacks including relatively high cost, maintaining cleanliness of the finger print reading area and possible transmission of communicable diseases. Others have suggested the use of iris scan technology. Using such technology, an authorized user is identified by a unique pattern associated with the iris of their eyes. To use this technology a user is required to look into a scanning device in the financial transaction machine whenever they wish to operate the machine.

Both of these alternative methods of identifying a user often meet with customer resistance. This is because many users wish to guard their privacy and do not wish to provide information concerning their finger prints or eye characteristics to third parties. Often there is a fear that such information will be abused. Users may be reluctant to expose themselves to the instruments which read the finger or eye characteristics. There is unfounded concern by some people that exposure to such instruments may be harmful. As a result, users are sometimes reluctant to embrace alternative methods of identification for financial transaction devices.

Operators of financial transaction systems also desire the capability of marketing goods and services products to users of financial transaction machines while they are conducting their transactions. However, in the past such marketing has not been very effective. This is due to the diverse interests of users of such machines. Information concerning the same products was provided to all users. For users not interested in the product offerings the presentation of the information was an inconvenience.

Thus there exists a need for a financial transaction apparatus and method that provides increased security without impinging on a user's privacy rights or exposing them to devices that they may perceive as potentially harmful. There further exists a need for a financial transaction apparatus that is capable of selectively marketing products to users, and which may prompt users to operate the apparatus through audio and visual instructions.

DISCLOSURE OF INVENTION

It is an object of the present invention to provide a financial transaction apparatus.

It is a further object of the present invention to provide a financial transaction apparatus that can identify an authorized user through their general outward appearance and voice characteristics.

It is a further object of the present invention to provide a financial transaction apparatus that may identify an authorized user based on a correlation between physical appearance and voice characteristics.

It is a further object of the present invention to provide a financial transaction apparatus that can identify an authorized user either by physical appearance and voice characteristics, or alternatively through manual inputs.

It is a further object of the present invention to provide a financial transaction apparatus that guides a user through transactions with audio prompts.

It is a further object of the present invention to provide a financial transaction apparatus that may guide a user through transactions with either audio prompts or visual prompts depending on the preferences of a user.

It is a further object of the present invention to provide a financial transaction apparatus that selectively markets product offerings to users based on user preference data.

It is a further object of the present invention to provide a financial transaction apparatus that selectively gathers user preference data, user image data and user voice data and uses such information to identify a user and to selectively market product offerings to the user.

It is a further object of the present invention to provide a financial transaction apparatus that provides multi-media presentations to a customer based on customer preference data.

It is a further object of the present invention to provide a financial transaction apparatus that includes a financial transaction machine that provides non-cash media that is redeemable for products.

It is a further object of the present invention to provide a financial transaction apparatus that receives inputs from a user through voice inputs.

It is a further object of the present invention to provide a method for operating a financial transaction apparatus which identifies a user based on a correlation of image data and voice data.

It is a further object of the present invention to provide a method for operating a financial transaction apparatus that provides information concerning product offerings to users selectively based on customer preference data.

It is a further object of the present invention to provide a method for operating a financial transaction apparatus which includes an operation sequence in which a financial transaction machine outputs audio messages to a user and receives voice instructions from a user in response thereto.

It is a further object of the present invention to provide a method for operating a financial transaction apparatus in which a user may selectively operate a financial transaction machine either through voice inputs or manual inputs.

Further objects of the present invention will be made apparent in the following Best Modes for Carrying Out Invention and the appended claims.

The foregoing objects are accomplished in the preferred embodiment of the invention by an apparatus comprising a financial transaction machine. The machine includes an imaging device such as a camera for providing image input signals. The machine also includes an audio input device for providing audio input signals. The machine further includes manually actuatable input devices such as a card reader and a keypad, and output devices such as a display screen and an audio speaker.

The financial transaction machine and the components thereof are in operative connection with a computer. The computer is connected to a data store. The data store includes data corresponding to a plurality of authorized users of the financial transaction machine. The user data includes for each user, identity data corresponding to the user such as a unique number, which may be a social security number or account number. The data store further includes data corresponding to an appearance feature of the user, as well as voice data corresponding to a voice feature of the user. The data store further preferably includes for each user, preference data which is representative of purchasing preferences of the user.

Also stored in the data store and in operative connection with the computer is product offering data representative of product offerings available for purchase by a user. Such product offerings may include goods or services offerings which the customer may purchase through the financial transaction machine. The data store further includes audio visual data which is intended to be of interest to purchasers of various product offerings.

In operation of the financial transaction machine a customer approaches the machine and their presence is sensed. The machine generates image input signals based on the customer's appearance feature and audio input signals based on the customer's voice feature.

The computer or other processor operates based on the signals and the information in the data store to determine if the appearance of the customer corresponds to a particular recognized user. The computer operates based on the audio input signals to determine if the voice of the customer corresponds to a particular recognized user. The computer then determines if the visual and audio data correlate sufficiently to indicate that the customer at the machine is one (and only one) recognized user. If the appearance and voice data correspond, the user is enabled to operate the transaction function devices which are a part of the machine.

Alternatively, if the user cannot be verified with a sufficient degree of reliability from the appearance and audio data, the customer is prompted to input identifying data through manually actuated devices on the machine, such as a card reader and/or keyboard.

Once the customer at the machine has been identified and the customer identity data is resolved, user preference data for the customer is determined from the data in the data store. Product offering data is then selected by the computer based on the user preference data. Information concerning product offerings that the user would be expected to be interested in is presented to the user through the financial transaction machine. In the preferred embodiment the user is enabled to instruct the machine concerning purchases through voice inputs. Alternatively, the customer may select to operate the machine silently through manual inputs.

When the customer has chosen to consummate a purchase of a product, the computer operates the financial transaction machine to provide the customer with a ticket, voucher or other article representative of the product offering. The computer further provides the customer with audio visual outputs which would be expected to be entertaining based on the customer's purchase while the customer is waiting for delivery of the article.

The user of the financial transaction machine is also enabled to conduct other banking transactions of types conventionally done through ATMs. However, in instances where the apparatus is capable of identifying the user through their appearance and voice inputs, there is no requirement that the customer input a card or PIN data to accomplish such transactions. Upon completion of the transaction the customer may take the items dispensed from the financial transaction machine and move away. Upon the customer moving away from the machine, the apparatus is then ready to process transactions for other customers.

BRIEF DESCRIPTION OF DRAWINGS

FIGS. 7–16 are schematic representations of audio and visual inputs and outputs which would be made to and from the apparatus of the present invention in conducting exemplary transactions in which the product offerings to users include various types of concert tickets, FIG. 16 being a listing of the various audio outputs made by the apparatus in the course of such transactions.

BEST MODES FOR CARRYING OUT INVENTION

Figure 1:
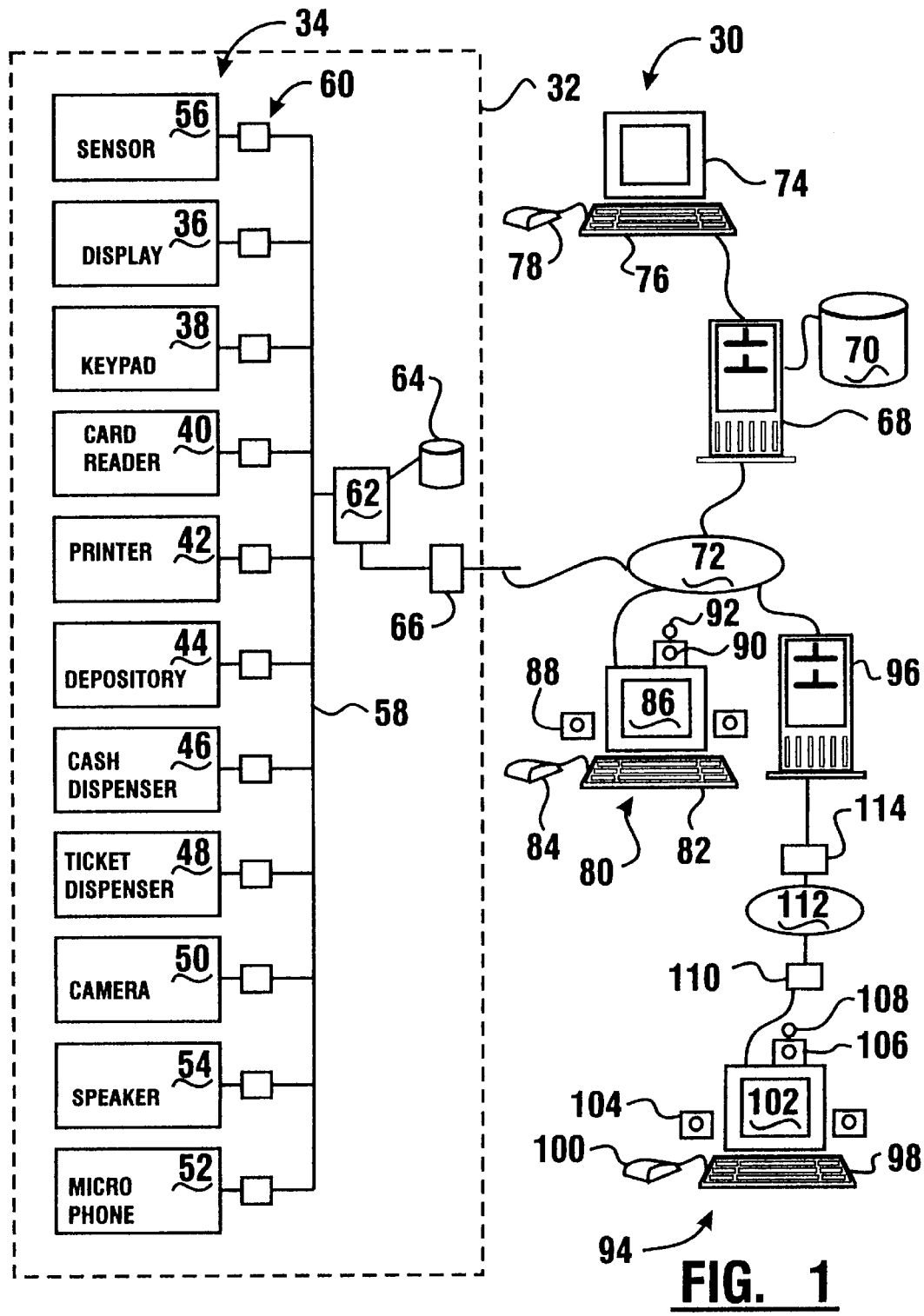
FIG. 1 is a schematic view of the financial transaction apparatus of a preferred embodiment of the present invention.

Referring now to the drawings and particularly to FIG. 1 there is shown therein a financial transaction apparatus of the present invention generally indicated 30. Apparatus 30 includes the financial transaction machine schematically indicated 32. Machine 32 as shown is an ATM which is capable of carrying out banking transactions as well as dispensing tickets or vouchers redeemable for products. In other embodiments, machine 32 may be another type of financial transaction machine such as a ticket printer, a scrip issuing device, a cash dispenser or other type of machine at which the identity of a user must be verified as an authorized user.

Machine 32 includes a plurality of devices 34 therein. Devices 34 include a display 36 which may be a CRT or similar output device. Manually actuatable input devices including a keypad 38 and a card reader 40 are included in the machine 32. Keypad 38 may be of the alpha numeric type similar to a telephone keypad or may be similar to a typewriter keyboard. Card reader 40 is one of several conventional types suitable for reading data from a card input by a user. Card reader 40 may be of a type suitable for reading magnetic stripe cards, smart cards or both.

Machine 32 further includes a printer 42. Printer 42 may be one or more printers that are housed within the machine. Printer 42 may be, for example, a receipt printer. Alternatively, printer 42 could be a printer suitable for printing items such as scrip, vouchers or tickets which are redeemable for products, which may be goods or services. Machine 32 further includes a depository 44. Depository 44 may be of the type that accepts deposit envelopes from a customer. Alternatively, depository 44 may be of the type that is capable of accepting and canceling checks, currency, travelers checks or other items of value that are input by a customer into the machine 32.

Financial transaction machine 32 further includes a cash dispenser 46. Cash dispenser 46 is a device for dispensing currency of one or more denominations to a customer. A ticket dispenser 48 is also shown housed in the exemplary machine 32. Ticket dispenser 48 may conventionally be a combination of devices for dispensing ticket stock as well as printing information thereon corresponding to the particular type of ticket that a customer has purchased.

Financial transaction machine 32 also includes a camera 50. Camera 50 serves as an imaging device which produces image input signals when a user is positioned adjacent to the machine. A suitable video camera for certain embodiments is a FaceIt® video camera made by Visionics Corporation of Meunchen, N.J. A microphone 52 is also included in the machine. The microphone serves as an audio input device which provides audio input signals in response to a user's voice inputs.

An audio speaker 54 is included in the financial transaction machine 32. Speaker 54 serves as an audio output device. The machine further includes a customer sensor 56. Customer sensor 56 may be one of either the optical, sonic or various other types that is suitable for detecting the presence of a customer in sufficient proximity to the machine so as to enable the verification of the user's identity in the manner hereafter described.

All of the devices 34 in the financial transaction machine 32 are connected to one or more communications buses schematically indicated 58. The devices are connected to the communications bus 58 through interfaces 60, each being appropriate for the particular device. Communications bus 58 is in connection with a processor 62. Processor 62 may comprise one or more processors or discrete computers. The processor sends messages to and receives messages from the devices and controls their operation. Processor 62 is in connection with a data store schematically indicated 64. Data store 64 includes instructions and other information used in the operation of the financial transaction machine 32. It should be understood that while in the embodiment shown the financial transaction machine is connected to external computers and processors as well as external data stores, embodiments of the invention may have the processing and data storage hardware and software needed for carrying out all transactions housed within the machine 32.

Processor 62 is in connection with a communications device 66. Communications device 66 is a modem or other device for communicating with other computers and systems. Communications device 66 may communicate via telephone line, wireless communication methods, fiber optic cables or other suitable means for sending and receiving data messages.

Communications device 66 is in communication with an external computer or server 68. Computer 68 includes a data store schematically represented 70. Financial transaction machine 32 is in connection with external computer 68 through a network schematically indicated 72. Network 72 may be either a local area network or a wide area network. Network 72 may alternatively be a proprietary type network or a public network such as the Internet. Security precautions suitable for the network type and system being operated should be employed. It should also be understood that although a single external computer 68 is shown, financial transaction machine 32 may be in communication with a plurality of computers through the network, each computer having one or more data stores associated therewith.

As shown in FIG. 1 computer 68 has output and input devices associated therewith. Monitor 74 of the machine serves as an output device. Keyboard 76 and mouse 78 each serve as an input device.

An input terminal generally indicated 80 is also in operative connection with the network 72. Input terminal 80 includes input devices including a keyboard 82 and a mouse 84. Input terminal 80 also includes output devices including a monitor 86 and speakers 88. A camera 90 and a microphone 92 are also included as a part of input terminal 80. Input terminal 80 may be used to input user data in a manner later discussed.

A remote terminal 94 is also included as a part of the apparatus 30. Remote terminal 94 is similar to input terminal 80 except that it is connected to network 72 through a server 96. Server 96 may serve as a fire wall or other screening device for limiting the transmission of messages to and from network 72.

Remote terminal 94 includes input devices including a keyboard 98 and a mouse 100. A monitor 102 and speakers 104 are output devices which are included as a part of remote terminal 94. Remote terminal 94 also includes a camera 106 and a microphone 108.

Remote terminal 94 is connected to a communications device 110 which in the preferred embodiment is a modem or other communications device. Modem 110 is in connection with a network 112 which may be a wide area network or local area network. Network 112 may be a private or proprietary network, or alternatively may be a public network such as the Internet. Server 96 is connected to a communications device 114 which transmits messages to and receives messages from the network 112.

In the operation of the system the data store 70 holds user data concerning authorized users of the apparatus. The user data includes user identity data which identifies particular users of the system. The user identity data preferably includes image data corresponding to an appearance feature of each authorized user which can be detected by the camera 50 viewing the face and/or upper torso of a user adjacent to the machine. In one embodiment of the invention the appearance feature data associated with the user is stored in the data store using face recognition software called FaceIt® which is commercially available from Visionics Corporation.

The data store 70 further includes voice data concerning authorized users. The voice data includes characteristics of an authorized user's voice and a particular password that is selected by the user. In one embodiment of the invention the data concerning the user's voice is generated and stored using automatic speech recognition software commercially available from Lernout & Hauspie of Belgium.

The user data stored in the data store further includes account data concerning each user. The account data preferably includes an account number associated with each user, as well as account information concerning balances and other data associated with savings, checking, credit card and other accounts. Such information may be stored in a manner which is conventional for financial transaction processing systems which operate ATMs or POS terminals. Such information may be input to the data store 70 through input devices similar to keyboard 76 and mouse 78 which are connected to computer 68 either directly or through the network 72.

Data store 70 further includes audio and video output data. The audio and video output data is data that is programmed to be output through display 36 and speaker 54 on the financial transaction machine 32. The video and audio output data provides display screens and audio prompts for prompting a user operating the machine. In one embodiment text to speech conversion software commercially available from Lernout & Hauspie is used to enable textual material presented in the video outputs to be converted to an audio output. This enables the financial transaction machine 32 to output the same user prompts and other information both visually and audibly.

Data store 70 further includes product offering data. The product offering data includes data representative of products such as goods or services which are available for purchase by authorized users of the machine 32. Such product offering data may include for example information concerning concert tickets, or scrip, coupons or vouchers that may be redeemed for goods or services. The data store further preferably includes audio visual presentation materials which preferably relate to the product offerings which customers may choose to purchase at the machine. Data store 70 also preferably includes user preference data for authorized users. The user preference data preferably includes information representative of types of product offerings that would be of interest to an authorized user. Such user preference data may include for example, musical preferences and other product preferences which would predict what types of goods and services are likely to be of interest to an authorized user. Such product preference data may be data representative of likes and dislikes provided by each user. Alternatively customer preference data may comprise demographic and other data stored in the data store from which probable likes and dislikes of users may be resolved. Computer 68 includes programs which operate to select product offerings that are likely to be of interest to a user based on the stored information.

Although in the described embodiment of the system data store 70 is described as holding the user data, it should be understood that data store 70 may consist of several data stores associated with several discrete processing units which work in coordinated relation to store and recover the user data. Alternatively, data store 64 in the financial transaction machine 32 may store some or all of the user data and program information necessary for operation of the system.

Prior to operation of the financial transaction apparatus the account data concerning authorized users is input to the data store 70 in a manner conventional for financial transaction processing systems. Product offering data is also input to the data store in a manner which will enable the display of information related to available product offerings on the display 36 of the machine 32. As hereinafter described, such product offering data may include upcoming concerts of various types, concert location, ticket pricing and other information pertinent to a customer's purchasing decision.

The audio visual information is also stored in the data store. Such audio visual information may be for example MPEG files which contain music videos of artists whose concert tickets are available for purchase through the machine 32. The data stores 70 and 64 are also programmed with the data necessary to operate the financial transaction machine 32 as an automated teller machine, as well as to communicate information concerning debits and credits to the customers' various accounts.

The customer image data, voice data and user preference data are obtained for input to the data store 70 through terminals similar to input terminal 80 or input terminal 94. Computer 68 preferably transmits messages in response to a profile acquisition routine stored in the data store 70. The profile acquisition routine is operative to obtain the user data from a user operating terminal 80 or 94. For example if a user is positioned at terminal 80 the user is prompted by the profile acquisition routine to input data that will identify them as an authorized user of the system. This may include for example an account number or a social security number which may be input through keyboard 82. In addition the customer may be prompted to input their PIN through the keyboard for heightened security.

The user is prompted through the monitor 86 or through speakers 88 to look at the monitor 86. Camera 90 which in the preferred embodiment is a FaceIt® face recognition camera commercially available from Visionics Corp. obtains the image input signals corresponding to the appearance of a user's face, head and/or upper body and the data is stored in the data store 70. Thereafter the profile acquisition routine operates to prompt the user by a message through speakers 88 or monitor 86 to state a password. The password can preferably be any word or phrase that the user chooses. When the user states the password his or her voice is picked up by microphone 92. The audio input signals generated by the microphone 92 are processed by the computer 68 and stored by the speech recognition software in the data store 70.

The data acquisition software further preferably prompts a user to provide information that may be used to establish the user preference data. Such user preference data may include demographic data, music preference data, economic data and other data which may be useful in determining the user's likes or dislikes. To obtain the customer's cooperation in providing accurate user preference data the customer may be offered an incentive such as free checking or a promotional item to provide this information.

In the course of providing this information the user may be asked to respond verbally to certain questions. These verbal responses are preferably not only used to produce the user preference data but also to enable the speech recognition software to obtain additional data by which to accurately recognize the user's voice. The profile acquisition routine is preferably sufficient to acquire the user preference data necessary for selectively marketing product offerings to a customer. The data acquisition routine is also preferably sufficient to obtain the voice and image data necessary to verify the identity of the user through his or her appearance and voice.

The users may operate terminal 80 at a bank branch or similar facility. At such a facility a customer service representative may assist the user in the operation of the terminal, or the representative may operate the terminal to acquire the customer image and voice data. Alternatively, the user may operate the terminal alone in response to prompts provided by the terminal.

It may be inconvenient in some instances for users of the system to travel to locations where terminals such as terminal 80 are available. Alternatively, users may prefer greater privacy and may provide the necessary user data from a remote location. This can be done using a terminal such as remote terminal 94. For example, remote terminal 94 may be a user's personal computer located at their home or office. Such a terminal may be connected through the Internet or other wide area network which is represented by network 112. Of course when customers are enabled to provide user data in this manner encryption and other security techniques are used to protect the customer's privacy as well as to minimize the risk of fraud.

A flow chart of the logic executed by the financial transaction apparatus of the present invention is represented by the flow chart in FIGS. 2–6. The logic steps in the flow chart generally correspond to the inputs and outputs for the transaction flow in FIGS. 7–15. The transaction begins from a starting point 116. At this starting point the machine 32 may be dormant. Alternatively, the display 36 and speaker 54 may be operating to present a welcome video so as to attract users to the machine. The welcome video is represented by the screen generally indicated 118 in FIG. 7.

Figure 2:
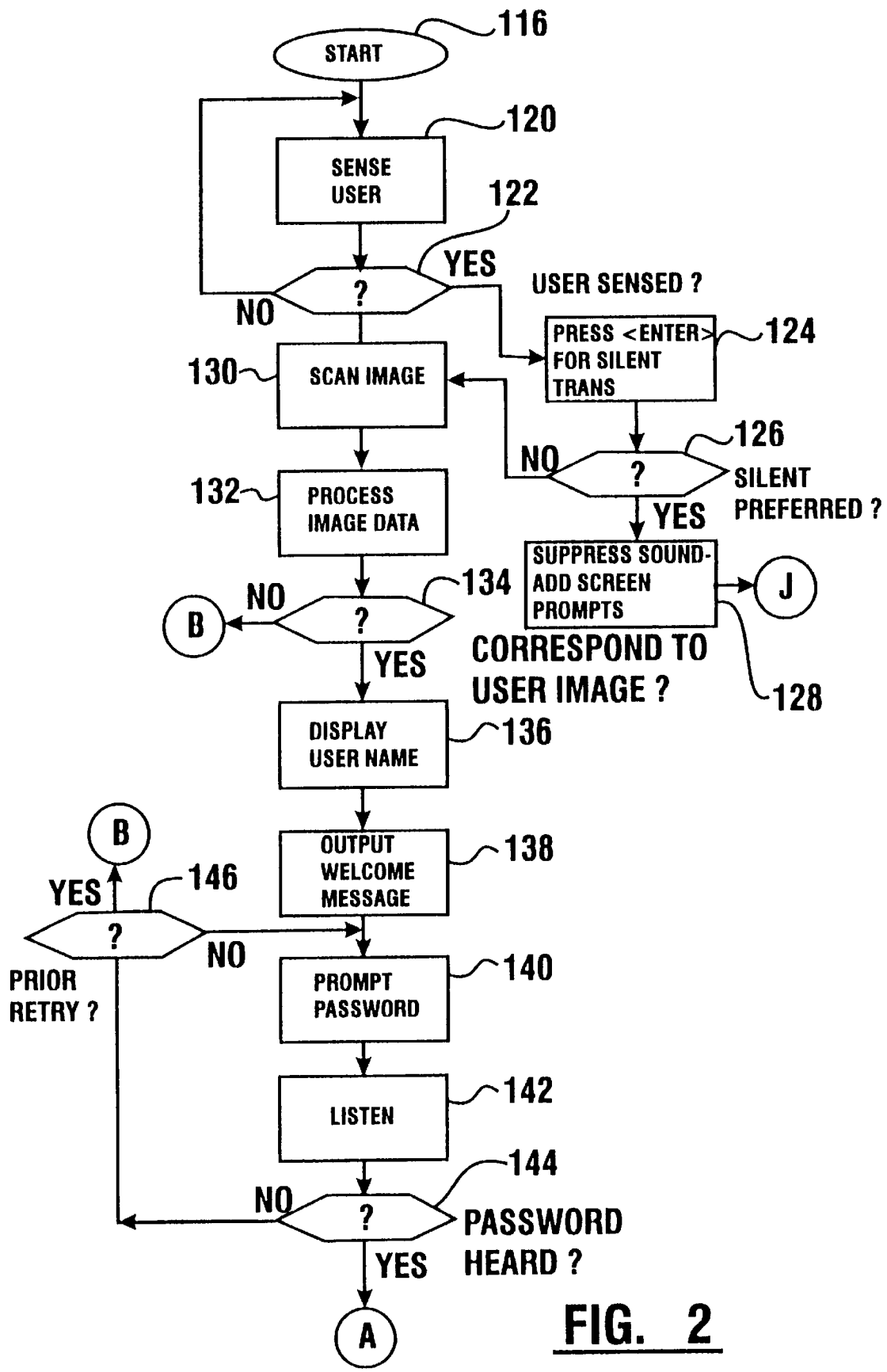
FIGS. 2–6 are a flow chart relating to an exemplary transaction conducted by a user with the financial transaction processing apparatus.

Upon a user approaching the machine, the presence of the user is sensed by sensor 56 at a step 120. A decision is made at a step 122 that a user has been sensed. In some embodiments when a user is sensed adjacent to the machine the camera 50 may be operated to acquire the image of the user. However, in some embodiments as indicated in FIG. 2, some users may prefer not to operate the machine in the interactive mode. For example, if a user is operating the machine with another authorized user's consent they would not be able to operate the machine based on their own image and voice. Alternatively, some users may prefer not to have the machine provide voice prompts or to receive voice inputs. As a result, at a step 124 a user is prompted upon being sensed as to whether they would prefer a silent transaction. A decision is made at a step 126 if the customer has indicated that they prefer a silent transaction and if so, a step 128 is executed.

In step 128 the processors operating the financial transaction machine 32 operate without or to suppress audible outputs. In addition, screen prompts are added to the presentations made at the display 36 to take the place of information that would normally be presented audibly. This is preferably accomplished using the text to speech software which is operated in the system. If the customer chooses to suppress the voice inputs and outputs the transaction flow proceeds through card/PIN inputs which are later discussed in connection with FIG. 3. As will be appreciated the sound suppression features of the machine may be desirable to persons having hearing or speech impairments who could not respond to the audible outputs or provide voice inputs. Alternatively, sound suppression may be desirable in noisy environments where a user has difficulty hearing the audible outputs, such as in a crowded shopping mall or at a sporting event. Alternatively, users may prefer to suppress the sound simply to maintain their privacy.

In alternative embodiments when the machine is operated in the sound suppression mode images of the user may be acquired during the transaction and stored in memory in correlated relation with the data concerning the transaction. The image data concerning the person operating the machine may later be recovered and analyzed in the event the customer contends the transaction was not authorized. Alternatively, image data may be acquired and stored for each transaction regardless of the mode in which the machine is operated.

If a user does not suppress the audible outputs or alternatively if the machine does not provide the option of such suppression, the transaction flow proceeds to a step 130 in which a user's face is observed by the camera. The orientation of the camera 50 on the terminal 32 is such that it centers its field of view on the face of the user and the software operates to adjust the field of view so as to capture image data centered about the user's face.

The camera provides image input signals which are processed by the appropriate processor at a step 132. After the image has been processed the determination is made as to whether the image data for the customer present at the machine corresponds to the image data for an authorized user stored in the data store. This is done at a step 134. If the image data does not correspond to an authorized user the transaction flow proceeds to prompt the customer to access the machine using their card and PIN as described in the transaction flow represented in FIG. 3.

If however the image data corresponds to an authorized user the transaction flow proceeds to a step 136. In step 136 the processor operates the display 36 of the terminal 32 to display a screen which includes the user's name. In addition, at a step 138 an audible voice output message welcoming the user is presented through the speakers 54 on the terminal 32. The welcome message, along with the other audible messages presented to the customer in this embodiment, are generated from WAV files which are stored in one of the data stores connected to a processor which is operatively connected to the terminal. The WAV files used in the exemplary transactions described herein are listed in FIG. 16.

Figure 15:
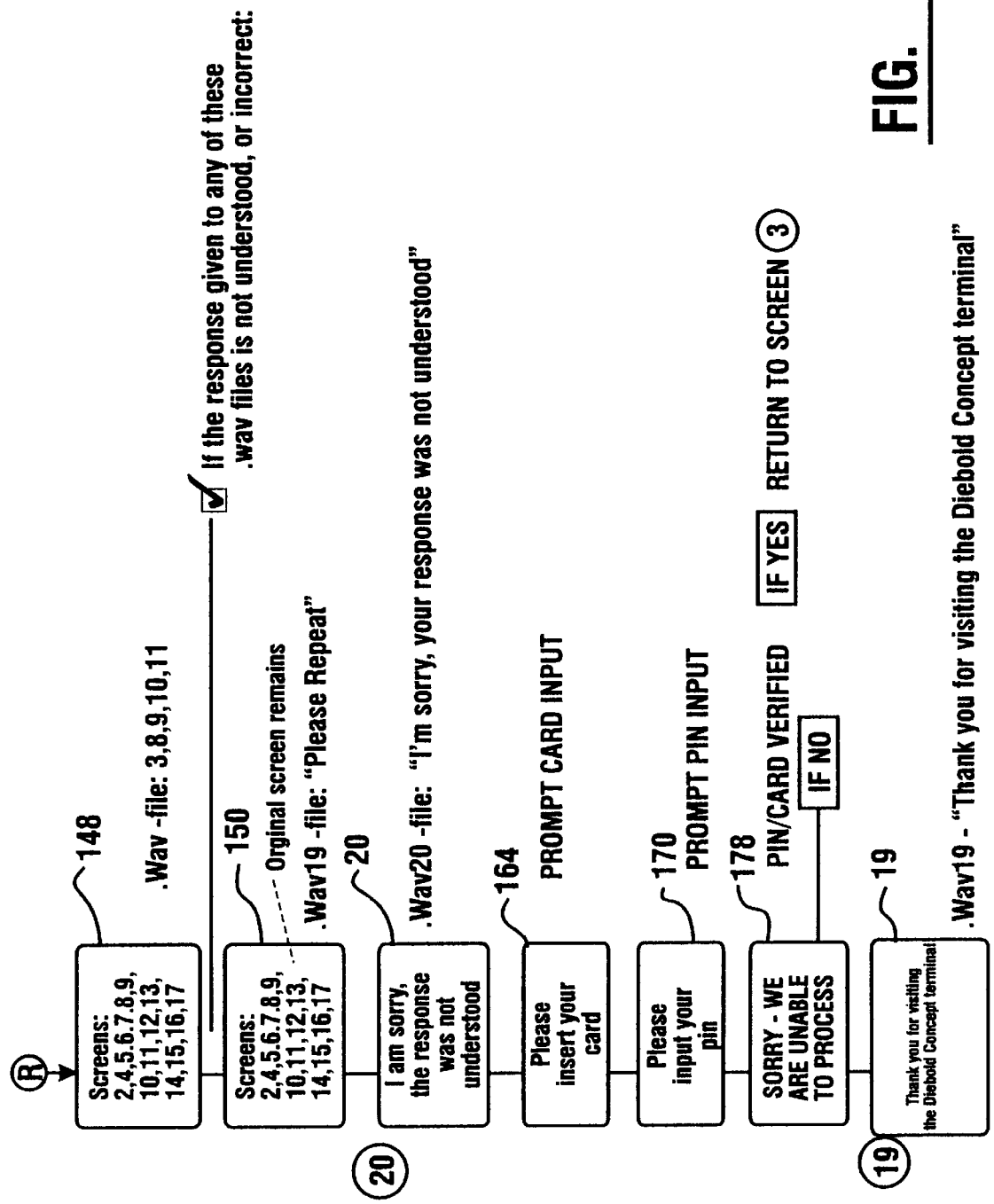

The transaction flow next proceeds through a step 140 in which a user is prompted through an audible message generated from a WAV file to state their password or pass phrase. This is represented by screen 2 in FIG. 7. At a step 142 the transaction flow listens for the password (or phrase) and at step 144 if a password is not heard the user is again prompted to state their password at a step 146. In the retry of step 140, an audible prompt is given to the user to "please repeat". This is represented in FIG. 15 by screens 148 and 150. It should be understood that screens 148 and 150 are not display screens but rather represent conditions which result in certain outputs. If the user's password is not understood on the second try an apology message is generated at a step 152. This apology message corresponds to screen 20 shown in FIG. 15. An audible apology message is output in connection with screen 20.

Figure 3:
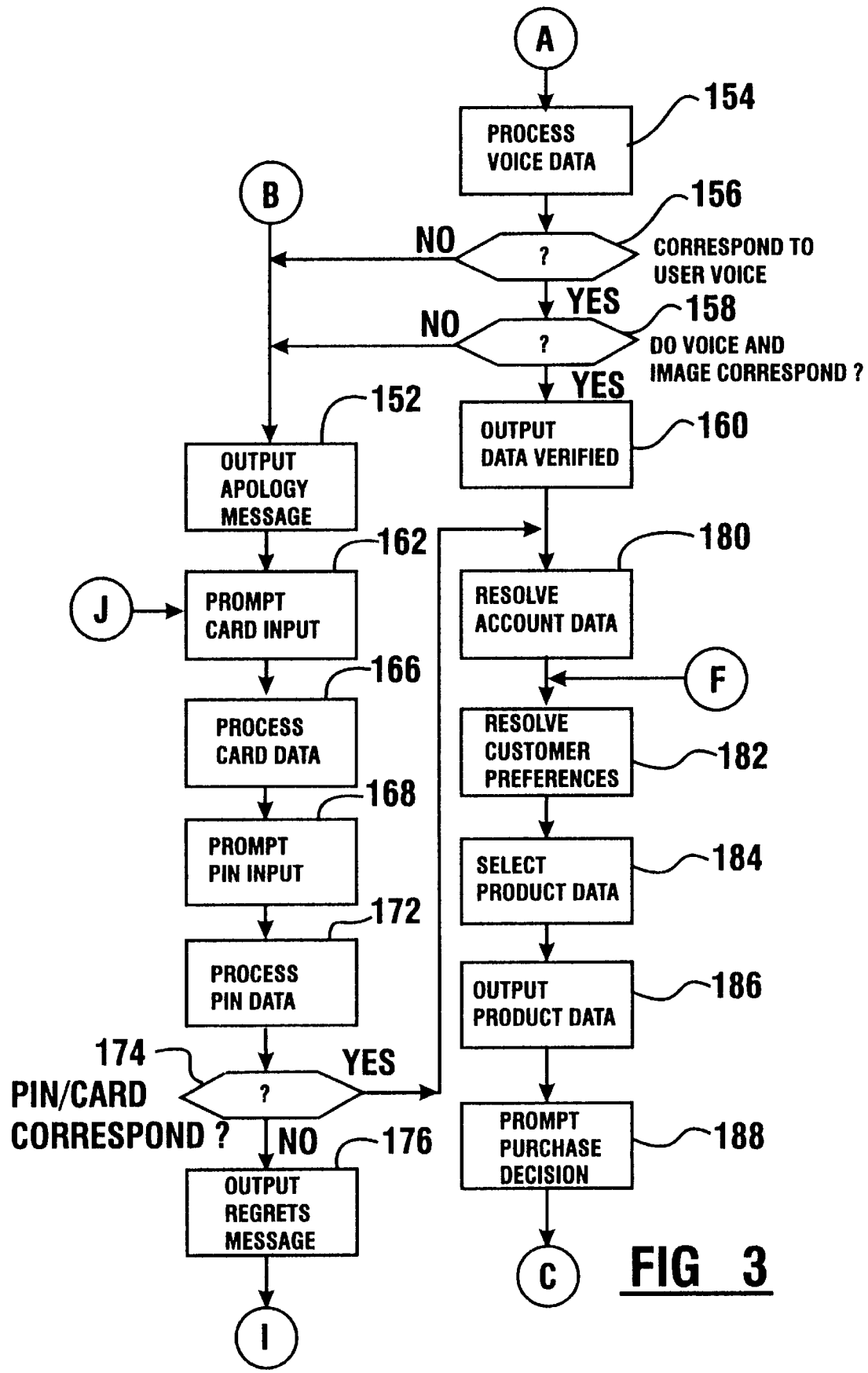

If the user's voice data is received the audio input signals from the microphone are processed in a step 154 represented in FIG. 3. At a step 156 a determination is made as to whether the audio input signals corresponding to the customer's password (or phrase) correspond to voice data stored in the data store for an authorized user. If not, the transaction flow proceeds to step 152 which produces the screen 20 previously discussed. If however the voice inputs correspond to an authorized user, then a determination is made at a step 158 as to whether there is a sufficient degree of correlation between the user identified from the voice data and the user identified from the image data to assure that there can only be one authorized user who is present at the machine.

Although step 158 in the described embodiment involves cross checking the identity data for the user identified through the image process with the user identified through the voice identification process, in other embodiments more complex correlations may be made. This is particularly true when algorithms of various types are used which may produce probability percentages concerning multiple authorized users. When such percentages are produced it may be necessary to establish a confidence level which indicates that both the image and voice data point to a single user, and that confidence level must be exceeded before the user will be considered to be properly identified. The particular method for correlating the results of the voice and image comparisons will depend on the particular techniques and algorithms used for such verification in the particular embodiment.

Figure 7:
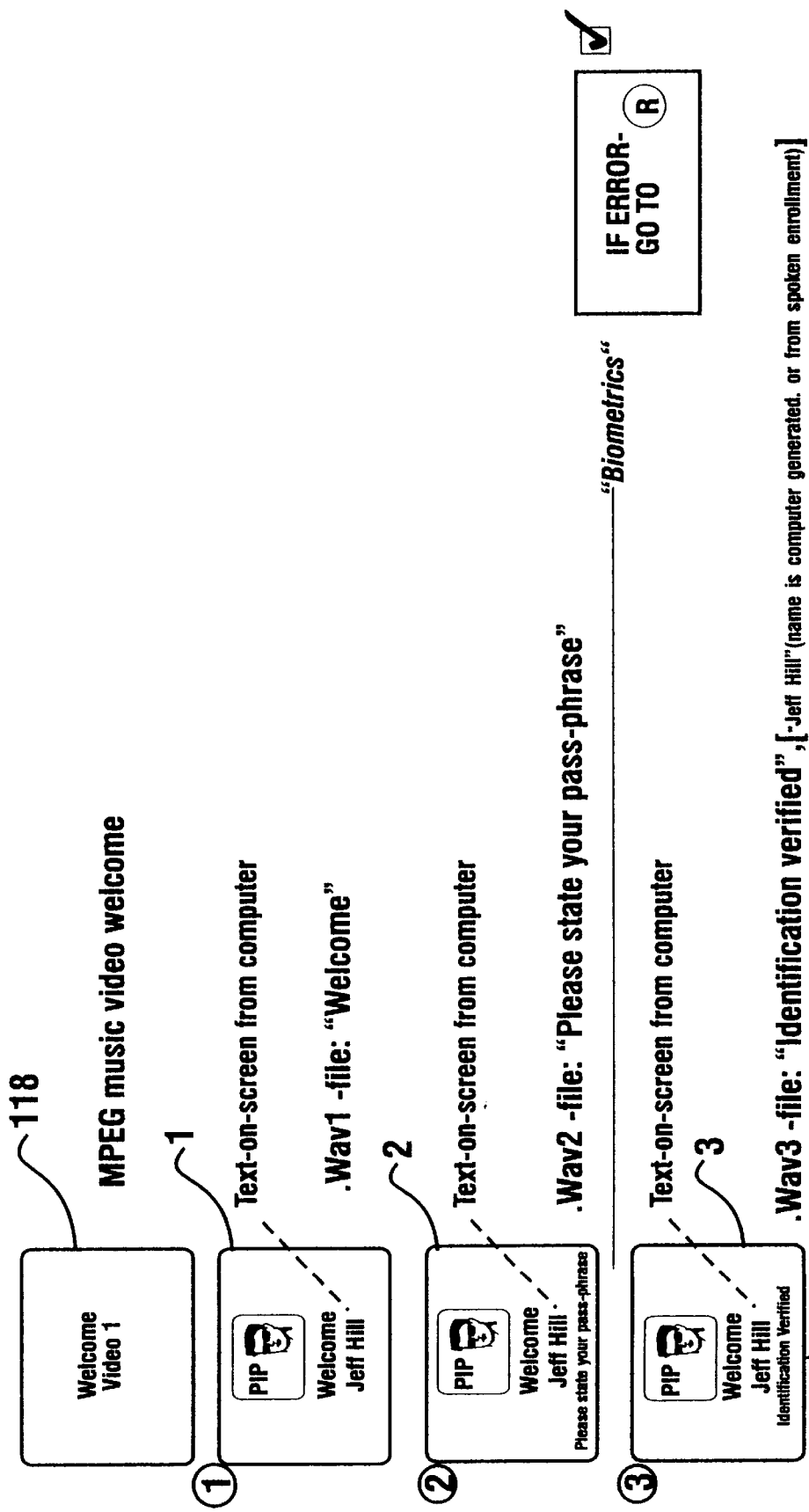

If the voice and image data do not correspond to a single authorized user in step 158 the transaction flow then proceeds through step 152 previously discussed. If however the voice and image data correspond the transaction flow proceeds to a step 160. In step 160 an output is presented on display 36 and a WAV file is used to generate a voice output which includes the words "identification verified". The voice output from the machine may optionally include the user's name, which in the case of the example in FIG. 7 is "Jeff Hill". This is represented by screen 3 in FIG. 7. The user's name may be computer generated based on a textual representation of the user's name stored in memory, with the audible signals being generated by the text to speech software. Alternatively, signals representative of the user's name as spoken by the user may be stored in memory at the time that the user provides user data to the system at terminals 80 or 94.

If during the appearance/voice verification the identity of the user cannot be verified from available data, the transaction flow proceeds through the apology message previously discussed. This message is generated in step 152 and corresponds to screen 320 in FIG. 15.

From there the transaction flow proceeds to a step 162 in which the user is prompted to input their card into the card reader 40 of the terminal 32. This prompting corresponds to the condition shown in FIG. 15 as screen 164. The transaction flow then proceeds to process the card data at a step 166. At a step 168 the user is prompted to input their PIN through the keypad 38. This corresponds to the screen condition 170 shown in FIG. 15. The PIN data is processed at a step 172 and a determination is made at a step 174 concerning whether the PIN and card data correspond to an authorized user.

If the PIN and card data do not correspond the transaction flow proceeds to output a regrets message in a step 176. A regrets message corresponds to screen condition 178 in FIG. 15. If the PIN and card data are properly verified then the transaction continues as though the apparatus were able to identify the user based on their appearance and voice data.

As previously discussed, embodiments of the invention may acquire and store images of the user and store it in memory in correlated relation with the transaction data when the machine is operated in this manner.

As shown in FIG. 3 the transaction flow next proceeds through a step 180 in which the user's account information is determined. Thereafter in a step 182 the customer's purchasing preferences are resolved based on the customer preference data stored in the data store. This preference data may correspond to information directly provided by the customer, or alternatively may be based on preference indications resolved through an analysis of the information that was provided by the customer. The analysis is preferably done by a computer.

The transaction flow then proceeds through a step 184 in which the customer preference data is used to select product data concerning available product offerings which are to be presented to the customer. Once the product data is selected, product data is output at a step 186.

Product data outputs presented in step 186 are represented by the series of promotional screens and outputs shown in FIGS. 8–13. As each of these screens and input and output flows identified as promos 1–6 are similar, only the screens in FIG. 8 will be discussed in detail.

Figure 8:
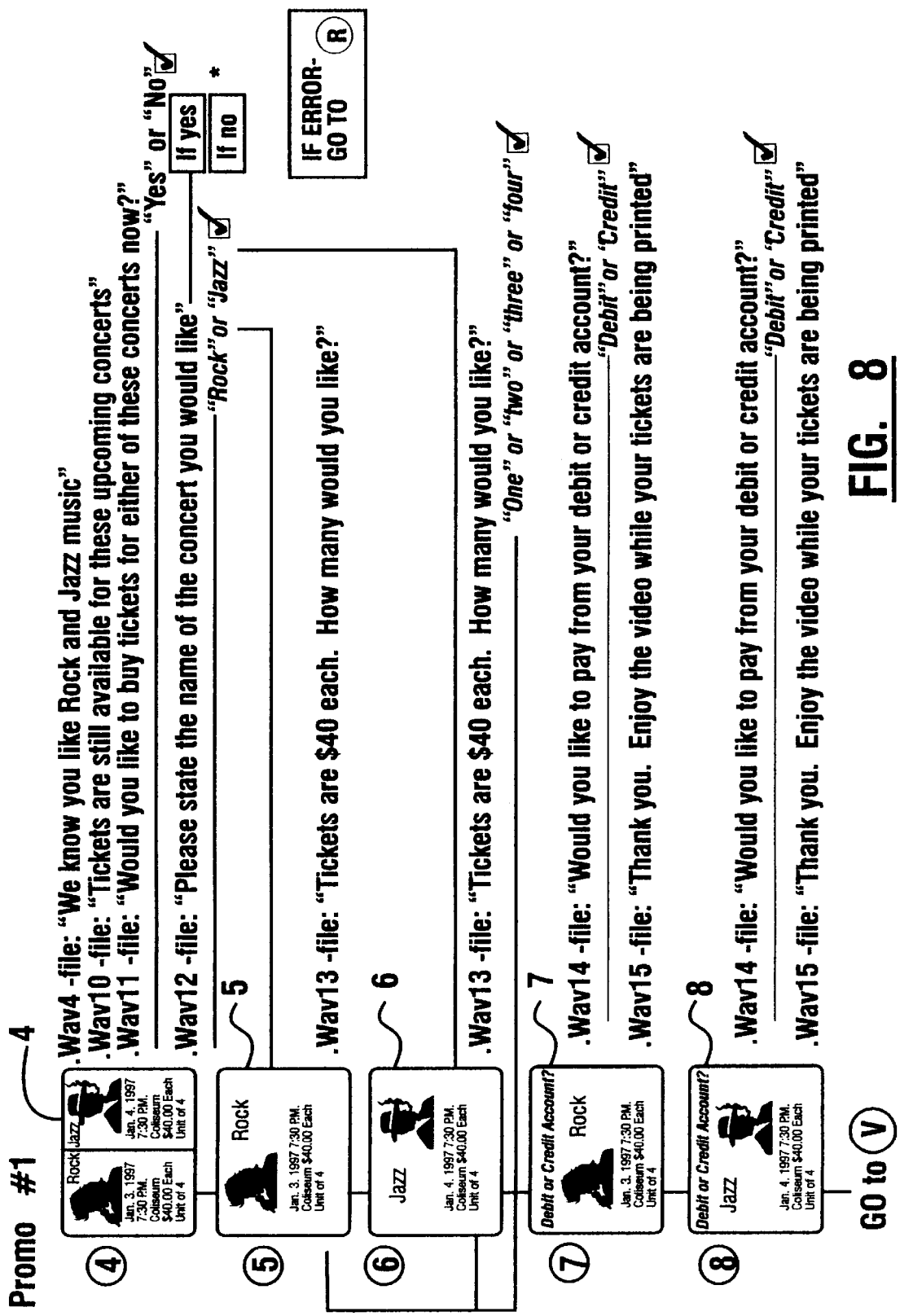

In the example shown in FIG. 8 the customer preference data has indicated that the user likes rock and jazz music. An audio message to the user to this affect is made in connection with screen 4. Information concerning upcoming rock and jazz concerts is presented on the display 36 of the terminal and an audible voice message indicating that tickets are still available for these concerts is presented.

In the transaction flow at a step 188 the customer is prompted to make a selection concerning whether they would like to purchase tickets for either of the concerts. This is done through an audible message from the terminal as shown in FIG. 8. The customer responds verbally with either a "yes" or "no". In the transaction flow the receipt of this purchase input, which is recognized by the speech recognition software, is indicated in a step 190. If the customer indicates through their audible response that they do not wish to purchase tickets to either concert the transaction flow proceeds through a step 192, and then proceeds to steps asking if the customer wants other transactions associated with the use of the transaction machine 32.

If however the user has elected to purchase, the transaction flow proceeds through a step 194 in which the user is prompted to make a purchase selection. As shown in connection with screen 4 in FIG. 8, the user is presented with an audible prompt which asks the user to state the name of the concert they would like. The words that the user is to use in responding are suggested by the information on the display. In this case as shown in FIG. 8, the user responds either with the word "rock" or "jazz". In the transaction flow shown in FIG. 4 the selection input made audibly through a voice response by the user is received in a step 196. At a step 198 a determination is made as to whether the user has selected option A (rock), and if so the transaction flow proceeds to a step 200 to output data representative of the selection. This allows the user to verify that the machine has properly received their selection. This is represented in FIG. 8 by screen 5 which corresponds to the selection of the "rock" concert.

Similarly if option A (i.e. the "rock" concert) was not selected in step 198, the transaction flow proceeds to a step 202 in which a determination is made as to whether the user responded by selecting option B "jazz". If so the transaction flow proceeds to output the selection data corresponding to "jazz" at a step 204. This step corresponds to the condition represented by screen 6 in FIG. 8.

Regardless of the selection made by the user, the transaction flow then proceeds to a step 206 which prompts the user to indicate a quantity input. As shown in FIG. 8 the prompt is an audible prompt which indicates the cost of the tickets for the concert selected and asks the user how many they would like. The user then responds with a quantity input. This is represented in the transaction flow by a step 208. It should be understood that although in the example shown in FIG. 8 the two concerts have tickets for the same price, this is merely coincidental. The price for any product is determined by the product offering data stored in the data store which may be different for different products.

The transaction flow then proceeds to a step 210 in which a check is made for receipt of the quantity input which is provided audibly by the customer. If the customer has provided a proper input the transaction flow then proceeds to prompt the user at a step 212 to indicate the account to which the tickets are to be charged. This is represented in FIG. 8 by screens 7 and 8 in which a user is prompted to indicate whether they would like to pay for their tickets using their debit or credit card. As indicated in the transaction flow by a step 214 the apparatus listens for the audio response from a user through the microphone 52 of the financial transaction machine 32. At a step 216 a check is then made for the proper receipt of the account data.

If the response from the customer is properly received, the account indicated by the customer's input is charged at a step 218. The process of charging the account is done in a conventional manner for debit or credit accounts. Although not shown schematically in the transaction flow the process includes a provision for stopping the transaction and notifying the customer in the event that the account cannot be charged, such as if it is overdrawn. Appropriate output messages are provided to the customer if this occurs. These messages are preferably provided in a manner so as not to embarrass the customer in the event of a misunderstanding.

In the event that the charge to the account is determined to be appropriate in step 218, the transaction flow proceeds through a step 220 in which the tickets ordered by the customer are prepared and dispensed by the ticket dispenser 48 in the terminal 32. This is done under the control of the processor or processors operating the terminal.

At a step 222 the transaction flow operates to resolve the audio visual data in the data store that is likely to be of interest to the user based on the product offering they have purchased. In the preferred embodiment this is data representative of a music video concerning the artist whose concert tickets the customer has purchased. After locating this video material the transaction flow operates to provide an output message as indicated in FIG. 8 which thanks the customer and tells them to enjoy the video. This is done at a step 224 in which the video is also presented to the customer. The outputs from the terminal 32 are represented by screens 7 or 8 in FIG. 8 as well as screen 226 in FIG. 14.

Figure 5:
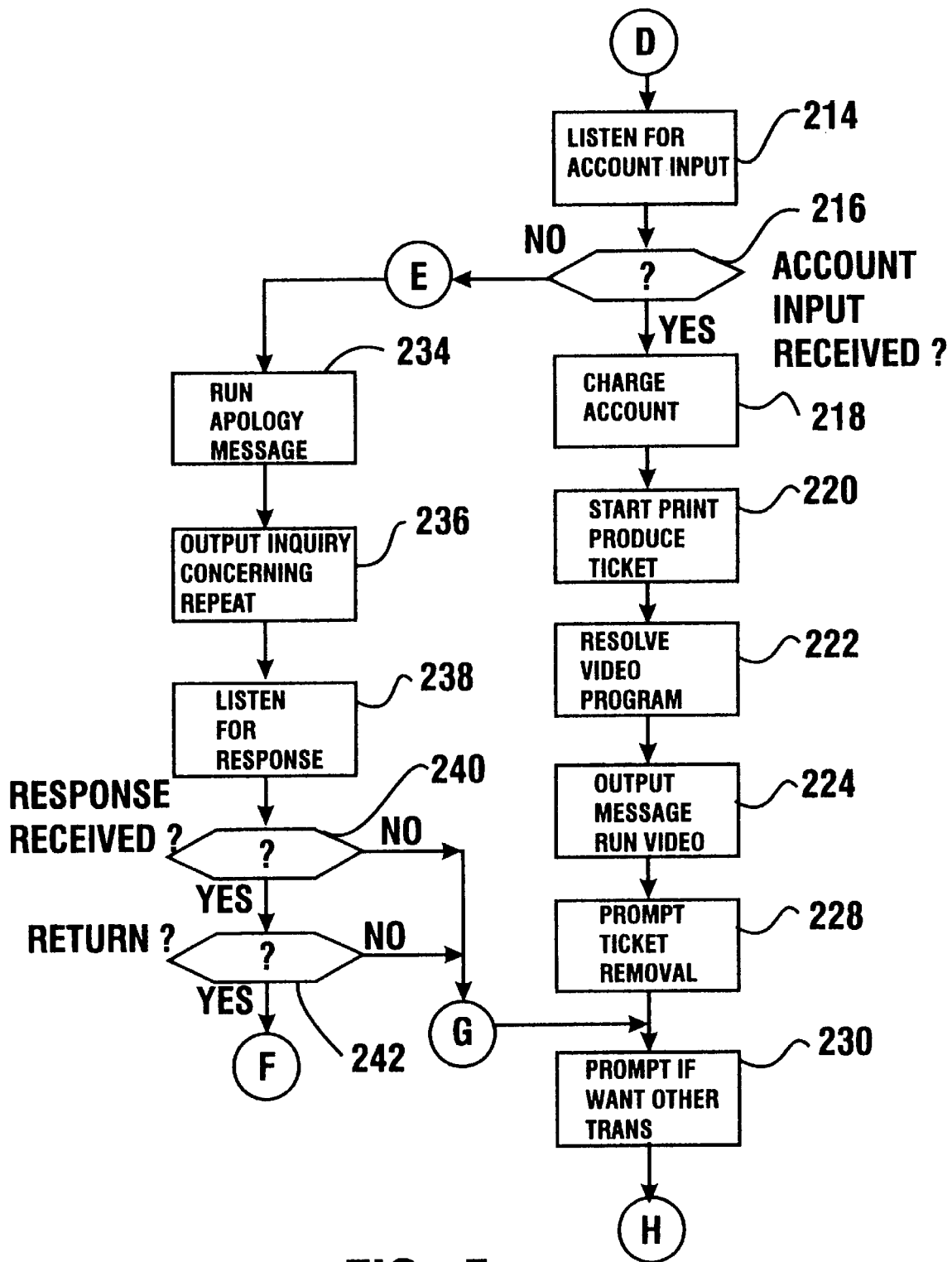
Figure 14:
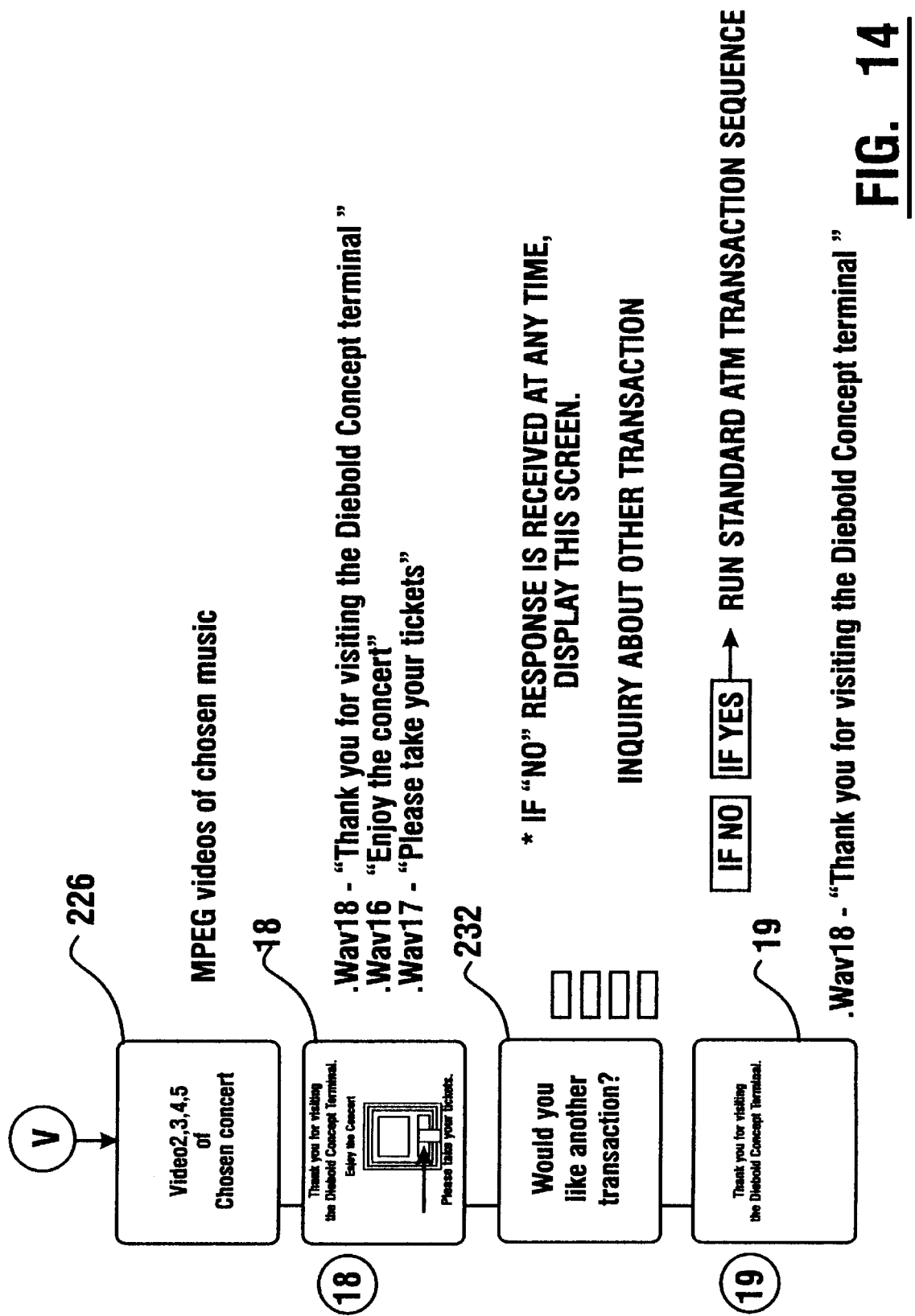

The transaction flow next proceeds through a step 228 as shown in FIG. 5, which corresponds to screen condition 18 in FIG. 14. In screen condition 18 audible prompts are made to the customer thanking them for visiting the terminal, telling them to enjoy the concert for which they have just purchased tickets, and also prompts them to take their tickets.

After the customer takes their tickets, the transaction flow prompts the customer through a step 230 to indicate if they want another transaction. This is represented by screen 232 in FIG. 14. If from step 230 the customer indicates that they would like another transaction, the transaction flow proceeds through an ATM transaction sequence which enables the customer to operate the transaction function devices on the ATM machine. This may include for example the printer 42, depository 44, cash dispenser 46 or the ticket dispenser 48. The manner in which the customer is enabled to operate these transaction function devices will depend on the particular set up and programming of the system.

Figure 4:
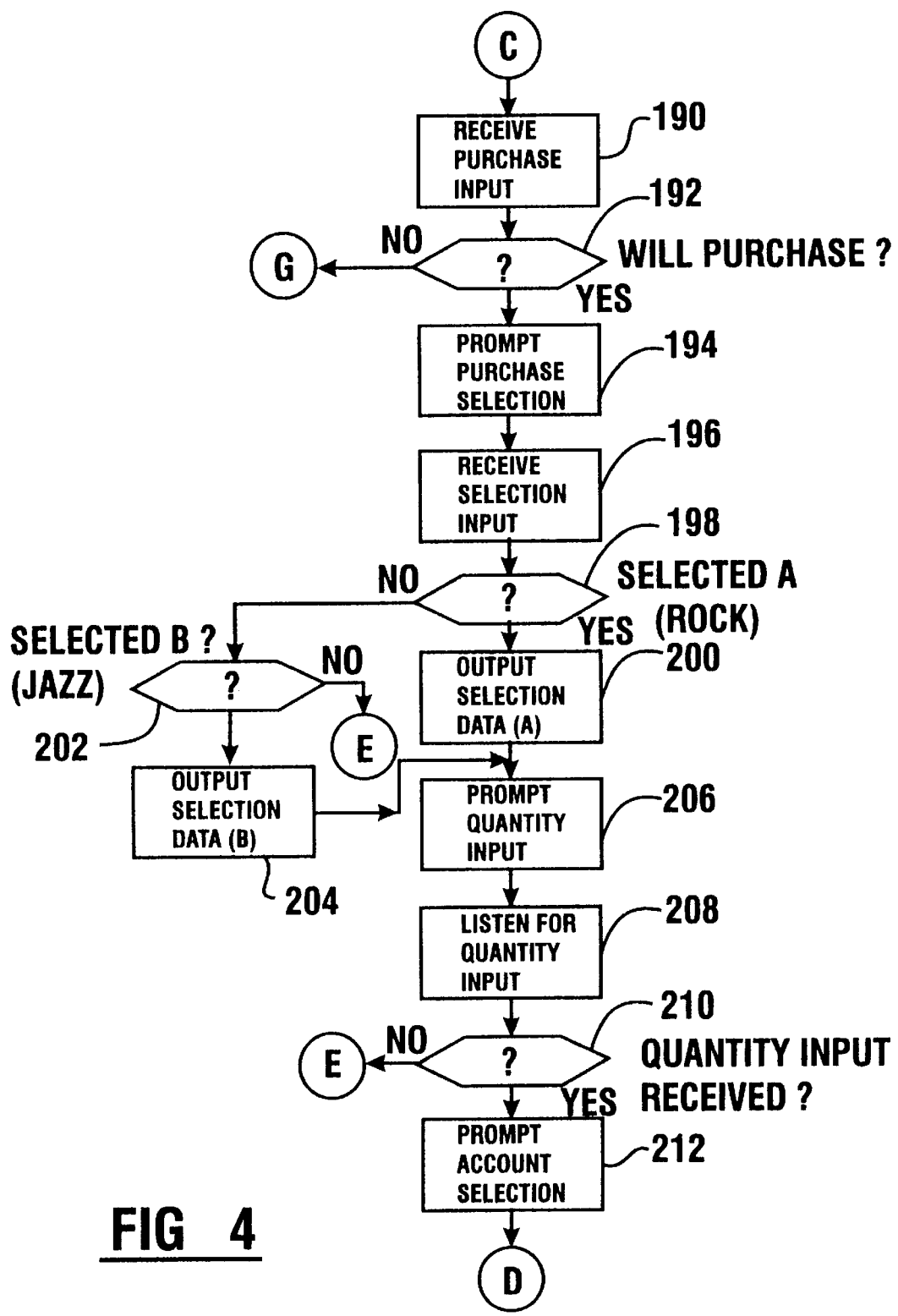

As represented schematically in FIGS. 4 and 5, if at steps 198, 210 or 216, a response from the customer is not received an apology message is presented at a transaction step 234. An output is then made at a step 236 asking the customer to repeat their response. This corresponds to screen condition 150 in FIG. 15 in which the customer is given an audible message to "please repeat" which is generated from a WAV file. In the transaction flow the machine then listens for a response at a step 238.

At a step 240 a determination is made concerning whether the customer has provided the audible voice input. If so, a determination is made at a step 242 if it is an appropriate input to return to the transaction sequence. If the input is appropriate the transaction flow then proceeds back through the series of steps to the point where the apparatus was unable to understand the user using the previously provided customer responses, and from there the transaction flow proceeds in the usual manner. If however no response is received or the response is inappropriate, the transaction flow proceeds to transaction step 230 in which the customer is asked if they would like another transaction. This corresponds to screen condition 232 in FIG. 14.

Figure 6:
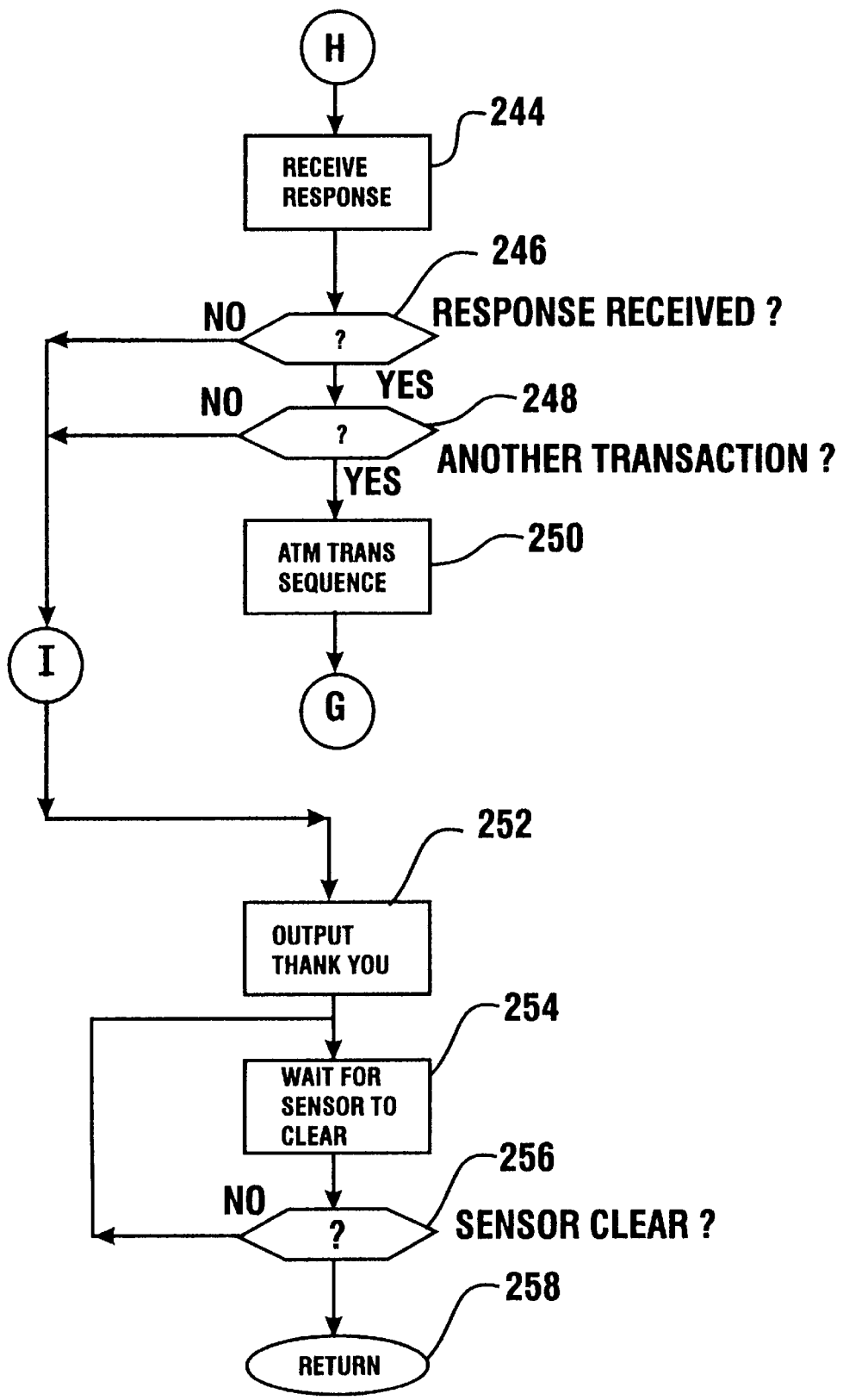

Referring to FIG. 6 the transaction flow next proceeds through a step 244 in which the response is received to the prompt concerning whether the customer wishes to conduct another transaction. At a step 246 a determination is made as to whether a response was received and if so, at step 248 it is determined if the response indicates that the customer wishes to proceed with other transactions. If so, the transaction flow proceeds to a step 250 which is representative of an ATM transaction sequence. It should be understood that this transaction sequence may be one of any number of sequences for prompting the customer in the operation of the transaction function devices included in machine 32.

If at step 246 or 248 a negative decision is made, then the transaction flow proceeds through a step 252 in which an output message is generated. This output message corresponds to the screen indicated 19 in FIG. 14. In the embodiment shown, when this screen is presented the terminal outputs an audible "thank you" message to the customer. It should be noted that this "thank you" screen is the same screen and the audible message is the same message that is presented to the customer in the event that the apparatus is unable to process the customer's transaction for any reason, as shown with reference to FIG. 15.

After the output message the customer may remain at the fnancial transaction machine 32 for a time reviewing the items that have been dispensed to them, or otherwise collecting their personal items. As it may be undesirable to have the apparatus again process data to identify the same customer, the transaction flow proceeds through a step 254 in which the system waits for the customer to leave the area so he or she is no longer sensed by sensor 56 of the machine. This is done through a step 256. Once a customer has left the area of the machine a return step 258 is executed to return the transaction flow to a position where the machine is ready to conduct transactions for another customer. Alternatively, if the customer does not leave the area of the machine in a predetermined time the transaction flow may query the customer to see if they desire another transaction. The machine may restart the transaction sequence or wait for a further period depending on the customer's verbal response.

Although not shown in the transaction flow, embodiments of the present invention may include provisions for immediately ceasing the transaction flow if an authorized user who is operating the machine moves away from the area adjacent to the machine. This may be helpful in circumstances where a user operating the machine becomes aware of a condition elsewhere that requires their attention and leaves. In such circumstances the apparatus is configured to stop the transaction and prevent the dispense of tickets, cash or other items of value to the user. In this way a user is able to leave the vicinity of the machine and not be concerned about forgetting to take their card or other valuables. This feature may be particularly advantageous to persons who are forgetful. Such persons may forget to bring their card to a machine and would otherwise be precluded from conducting transactions. Alternatively a customer may forget to take their card, or the currency or other valuables that have been dispensed to them. The present invention increases convenience and reduces the risk to such users.

It should be understood that while in the preferred embodiment a combination of visual and audio prompts are used to prompt the customer to conduct transactions, in other embodiments other combinations of prompts or prompts of only one type may be used. For example, as previously discussed, for individuals who are hearing impaired or desire privacy, the machine is operable to provide only visual prompts. A customer is then enabled to operate the machine through manually actuatable devices such as virtual "buttons" which may be provided on display 36 if it is a touch screen display, or physical buttons which are sometimes conventionally provided adjacent to such a display. Alternatively, manual inputs may be provided through the keypad 38. The card reader also serves as a manual input device which responds to the manual input of cards. In some embodiments card data, particularly data stored on a smart card, may be used to facilitate the conduct of transactions by handicapped individuals.

Alternatively, the machine may be operated with all outputs being of the audible type. This is advantageous to persons who are visually impaired. The software for converting text to speech and vice versa used in the preferred embodiment facilitates the flexibility of the machine and the accommodation of persons with handicaps. The inclusion in the machine of manually actuatable input devices which may be in the form of a touch screen, card reader, keypad or other devices, greatly facilitates various modes of operation of the preferred 154 embodiment of the apparatus.

Figure 9:
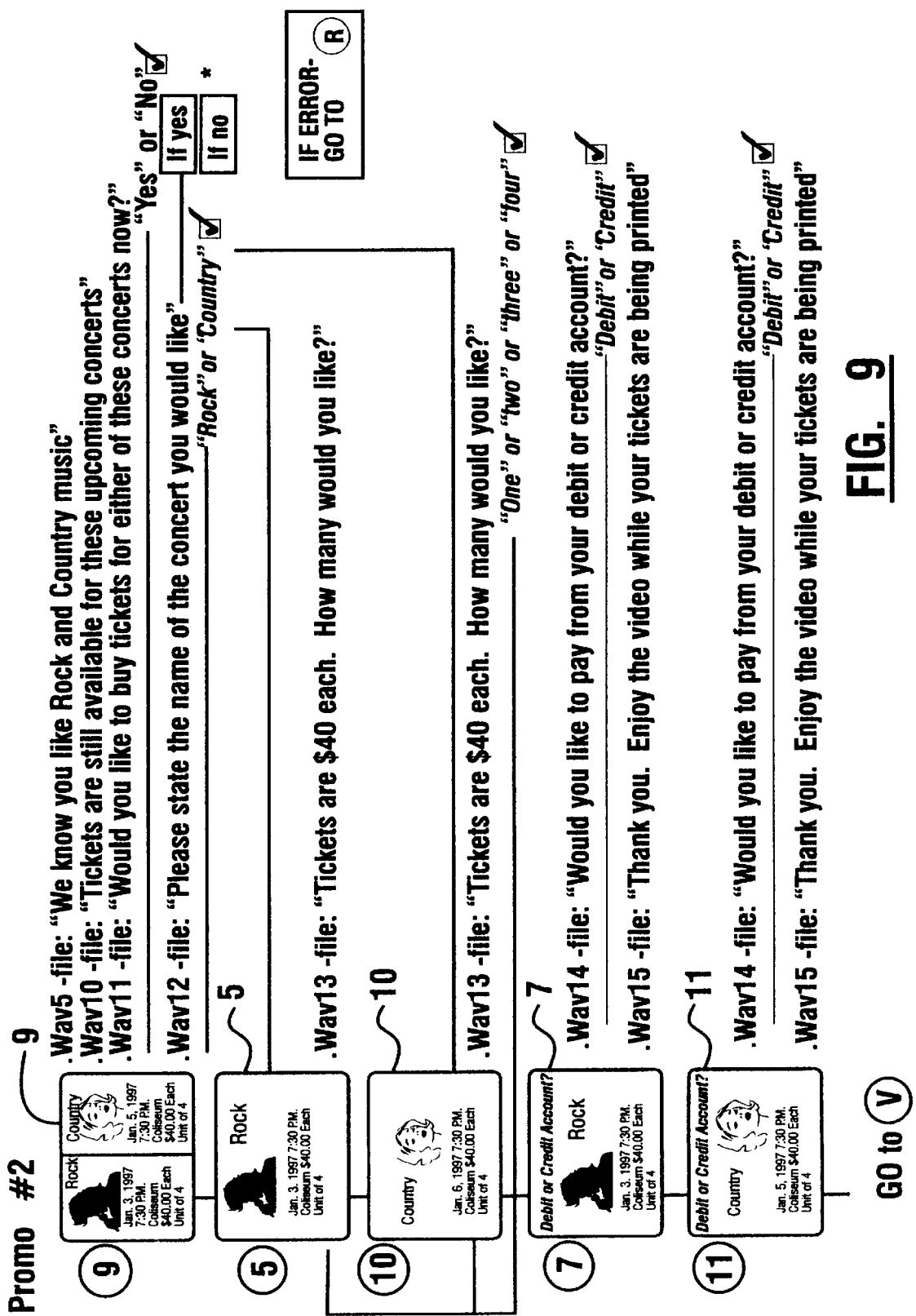
Figure 10:
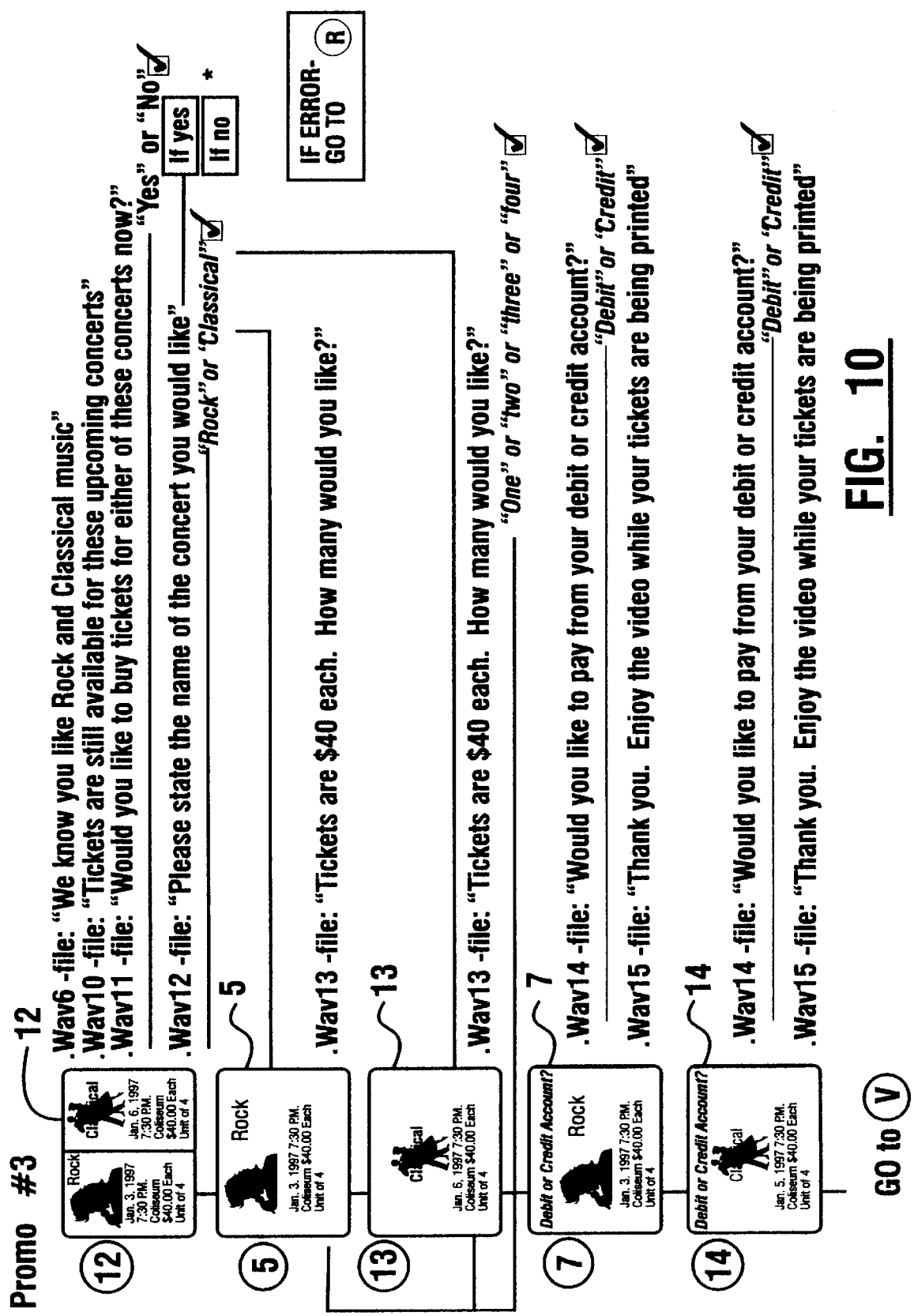

As will be appreciated from the foregoing discussion of the transaction flow in connection with FIG. 8, alternative types of product offering data may be presented to customers based on the customer preference data stored in the data store. For example, FIG. 9 shows a similar transaction for a customer who prefers rock and country music. The screen conditions associated with this transaction flow are screen conditions 9, 5, 10, 7 and 11. Likewise FIG. 10 shows a transaction for a person who prefers both rock and classical music. The screen conditions involved are designated 12, 5, 13, 7 and 14.

Figure 11:
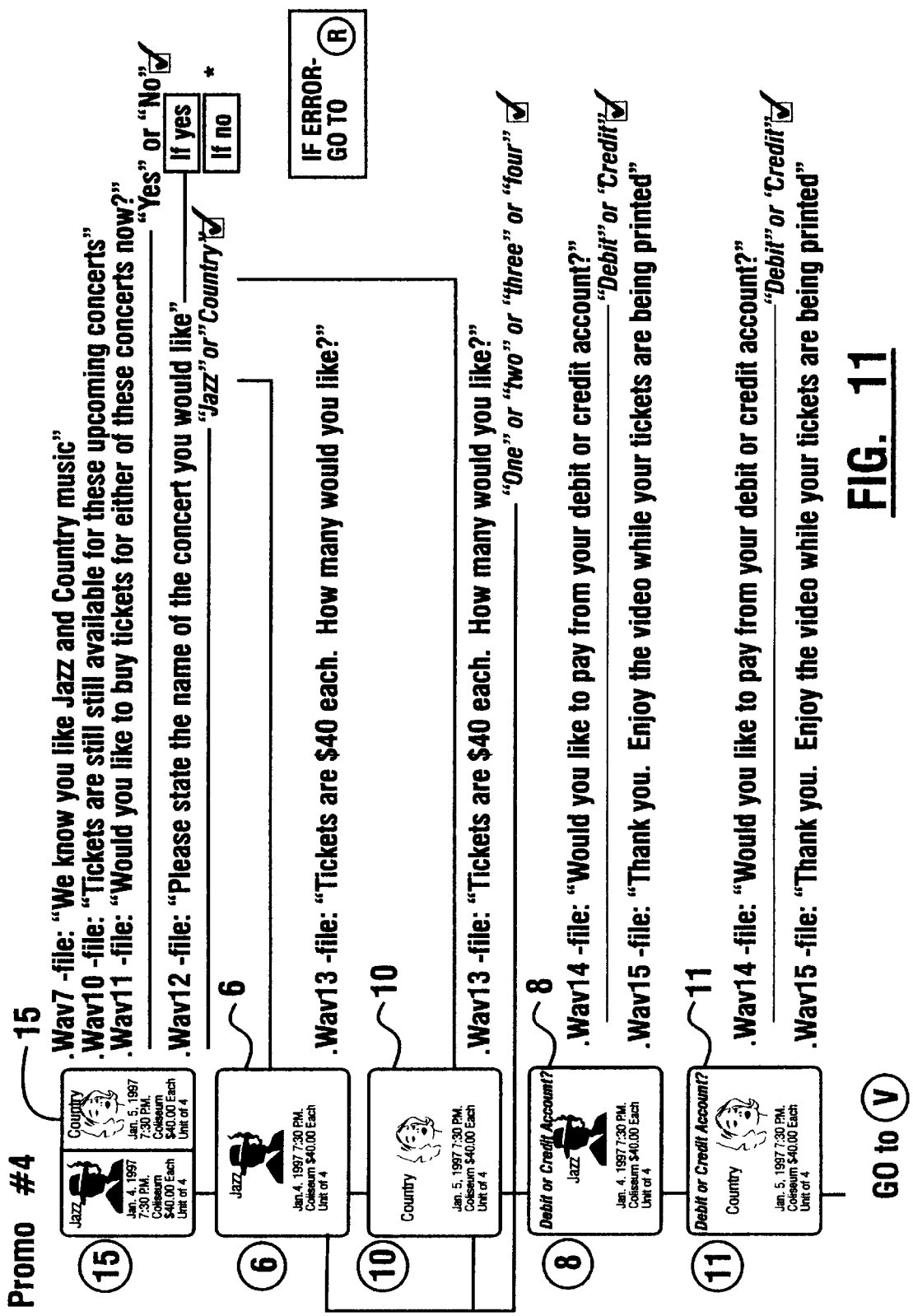
Figure 12:
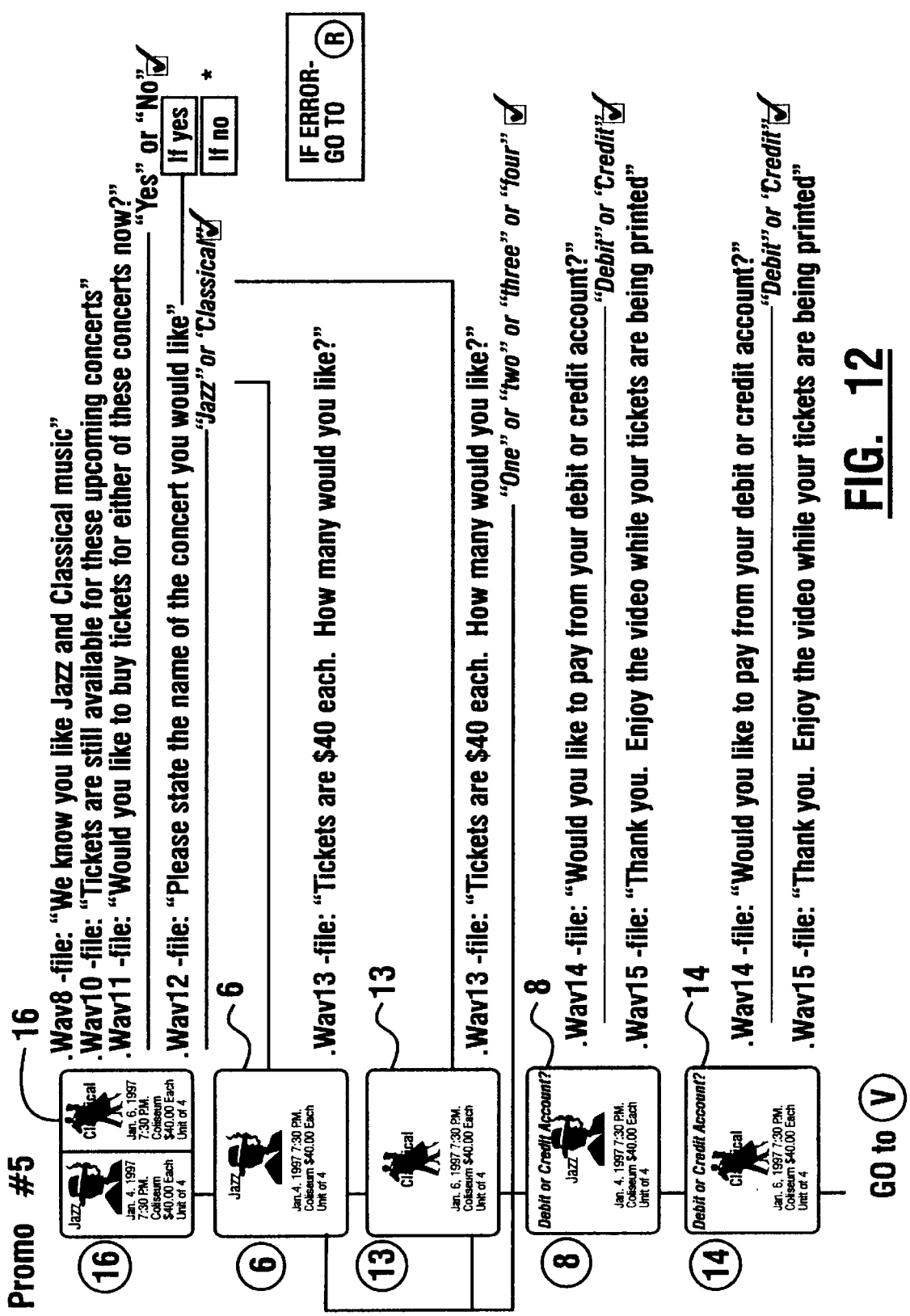
Figure 13:
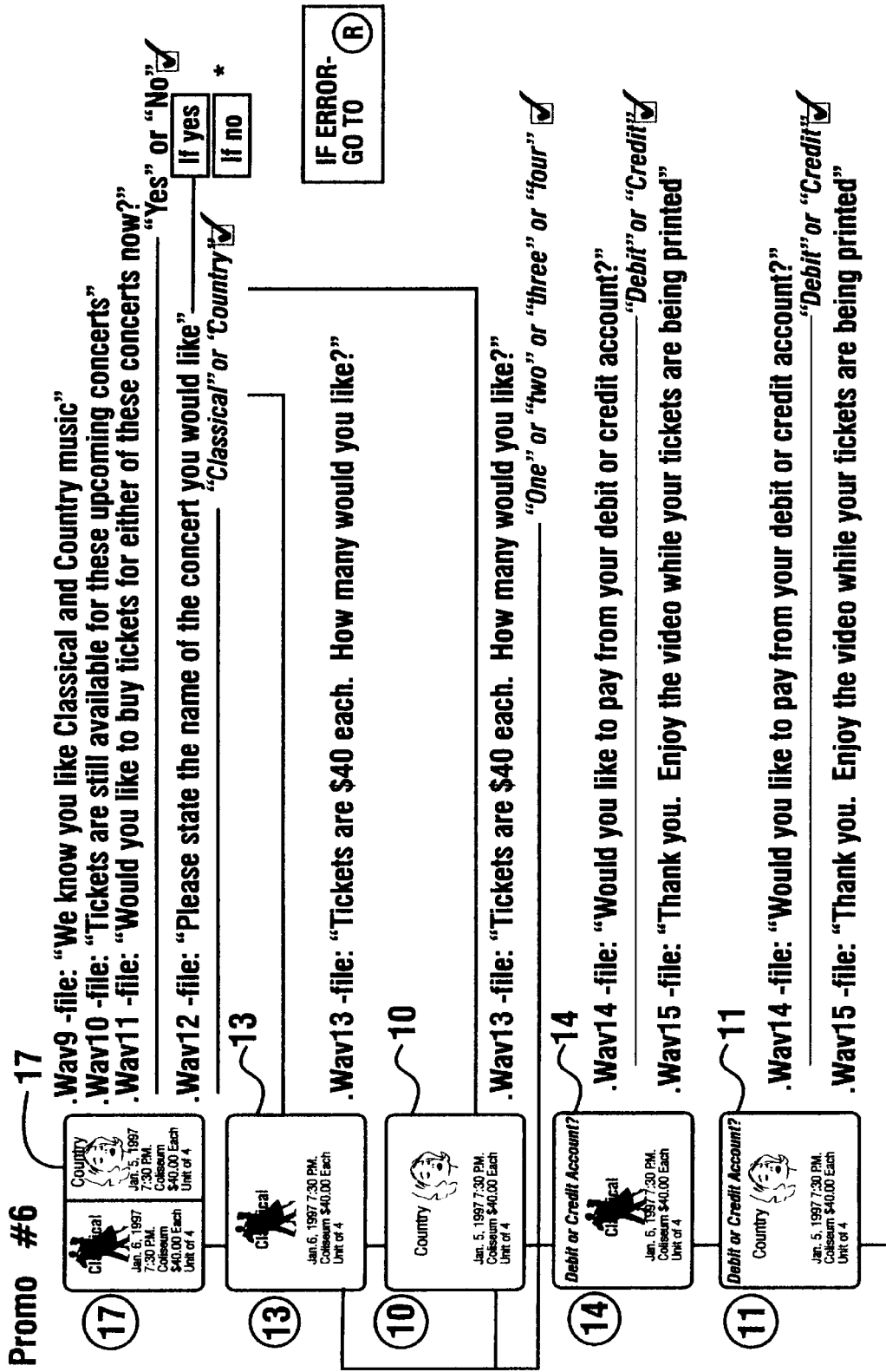

FIG. 11 shows a transaction for a person whose preferences are jazz and country music. The screen conditions displayed are 15, 6, 10, 8 and 11. A person whose preferences are for jazz and classical music would be presented with the screen display shown in FIG. 12. These are screen conditions 16, 6, 13, 8 and 14. Finally, FIG. 13 presents the screens for a transaction by a person who prefers classical and country music. The screen conditions are 17, 13, 10, 14 and 11. As will be appreciated from the foregoing discussion these particular product offerings are exemplary only, as are the screen conditions and audio and visual prompts. Many other types of products may be offered through the financial transaction apparatus of the present invention. Principles of the present invention may be incorporated in other types of apparatus and systems which are adapted to dispense items of various types based on identifying a person as an authorized user by image and voice characteristics. Common products include tickets to sporting events, gaming tickets, transportation tickets, or any other type of product offering representing goods or services that may be conveniently represented by a voucher or ticket. The present invention may also be connected through network 72 or network 112 to repositories of product offering data and audio visual material which will enable users to purchase a wide variety of products through the apparatus of the present invention.

As the previously described embodiment demonstrates, users may select from several product offerings simultaneously. While in the embodiment shown the user selects between two offerings in the same category (i.e. concert tickets), in other embodiments the customer may select from a different number of product offerings of different types. The presentation of product offering information may be tailored to the products and customers, and in some instances some customers may receive much broader or limited product offering information.

The preferred embodiment of the present invention also enables the accurate identification of an authorized user without the need for the user to carry an identification card.

While the present invention achieves accurate identification it does not generally offend notions of privacy for individuals who do not want others to have access to their finger prints or iris scans. In addition, it is unlikely that the preferred form of the present invention will be perceived as posing any risk to customers who may have concerns about devices that scan their eyes, hands or other body parts.

Thus the new financial transaction apparatus and method of the present invention achieves the above stated objectives, eliminates difficulties encountered in the use of prior devices and methods, solves problems and attains the desirable results described herein.

In the foregoing description certain terms have been used for brevity, clarity and understanding. However no unnecessary limitations are to be implied therefrom because such terms are used for descriptive purposes only and are intended to be broadly construed.

Moreover the descriptions and illustrations herein are by way of examples and the invention is not limited to the exact details shown or described.

In the following claims any feature described as a means for performing a function shall be construed as encompassing any means capable of performing the recited function and shall not be deemed limited to the particular means described herein as performing the recited function or mere equivalents thereof.

Having described the features, discoveries and principles of the invention, the manner in which it is constructed and operated and the advantages and useful results attained; the new and useful structures, devices, elements, arrangements, parts, combinations, systems, equipment, operations, methods and relationships are set forth in the appended claims.

We claim:
1. Apparatus comprising:
   a financial transaction machine, wherein the machine includes an imaging device providing image input signals, and an audio input device providing audio input signals, and at least one transaction function device, whereby a user adjacent to the machine causes image input signals to be generated and the voice of the user causes audio input signals to be generated;
   a processor, the processor being in operative connection with the imaging device, the audio input device and the transaction function device, the processor also being in operative connection with a data store, wherein the data store includes data corresponding to a plurality of users, the user data for each user including identity data corresponding to the user, image data corresponding to an appearance feature of the user, and voice data corresponding to a voice feature of the user;

wherein the processor is operative responsive to the image input signals to resolve first identity data, and the processor is operative responsive to the audio input signals to resolve second identity data, and wherein the processor is operative to compare the first and second identity data for a level of correlation and to enable operation of the transaction function device when the level of correlation is reached.

2. The apparatus according to claim 1 wherein the machine includes a sensing device, wherein the sensing device is operative to sense the user in proximity to the machine, and wherein the sensing device is in operative connection with the processor, and wherein the processor is operative to resolve the first identity data responsive to the sensing device sensing the user in proximity to the machine.

3. The apparatus according to claim 1 wherein the machine includes an output device, and wherein the output device is in operative connection with the processor, and wherein the processor is operative to prompt the user to speak through prompt outputs presented through the output device, whereby when the user speaks audio input signals are generated.

4. The apparatus according to claim 3 wherein the output device includes a display.

5. The apparatus according to claim 3 wherein the output device includes a speaker.

6. The apparatus according to claim 5 wherein the data store further includes audio output data corresponding to audio outputs, and wherein the output device prompts the user through audio messages.

7. The apparatus according to claim 1 wherein the machine further comprises an output device and a manually actuatable input device and wherein when the level of correlation is not reached the processor is operative to prompt a user through the output device to operate the manually actuatable input device.

8. The apparatus according to claim 7 wherein the manually actuatable input device includes a card reader, wherein the user is prompted to input a machine readable card associated with the user in the card reader.

9. The apparatus according to claim 8 wherein the user data further includes account data wherein the account data includes at least one account associated with each user, and wherein the machine readable card includes account identifying data corresponding to an account associated with the user of the card, and wherein the card reader provides card input signals responsive to reading the card, and wherein the processor is operative to resolve the account of the user responsive to the account identifying data.

10. The apparatus according to claim 9 wherein the machine includes a keypad, and wherein the processor is operative responsive to resolving the user account data to operate the output device to prompt the user to input a code at the keypad, wherein the keypad generates keypad input signals responsive to the user inputting the code at the keypad, and wherein the processor is operative to enable operation of the transaction function device responsive to the keypad input signals corresponding to input by the customer of a predetermined code.

11. The apparatus according to claim 1 wherein the transaction function device includes a currency dispenser.

12. The apparatus according to claim 1 wherein the transaction function device includes a ticket dispenser.

13. The apparatus according to claim 1 wherein the machine includes an output device, and wherein the user data includes user preference data, and wherein the data store further includes product offering data, wherein the product offering data is representative of products available for purchase, and wherein the processor is operative to select product offerings from the product offering data in the data store responsive to the user preference data corresponding to the user, and to operate the output device to provide outputs corresponding to the selected product offerings.

14. The apparatus according to claim 13 wherein the machine includes a display and the data store further includes data representative of video materials, and wherein the processor is operative responsive to the user preference data to select video material from the data store and to provide outputs on the display corresponding to the selected video material.

15. The apparatus according to claim 1 and further comprising an input terminal in operative connection with the processor, wherein the input terminal includes a further imaging device and a further audio input device, wherein the user image data and user voice data is input through the input terminal.

16. The apparatus according to claim 15 wherein the data store further includes a user profile acquisition routine, and wherein the processor is operative to acquire data from a user at the input terminal responsive to the user profile acquisition routine.

17. The apparatus according to claim 1 wherein the machine includes a sensing device, wherein the sensing device is operative to sense the user in proximity to the machine and wherein the sensing device is in operative connection with the processor, and wherein the processor is operative to cease operation of the transaction function device responsive to the sensing device ceasing to sense the user in proximity to the machine.

18. A method of operation of an apparatus comprising the steps of:
    storing in a data store in operative connection with a processor, user data for a plurality of users, said user data including:
        identity data corresponding to an identity of each user;
        image data corresponding to an appearance feature of each user; and
        voice data corresponding to a voice feature of each user;
    and thereafter in any order further comprising the steps of:
    acquiring with an imaging device on a transaction machine an appearance feature of a user adjacent to the machine;
    resolving first user identity data with said processor from said appearance feature and the image data in the data store;
    receiving with an audio input device on the transaction machine a voice feature of the user adjacent the machine;
    further resolving second user identity data with the processor from the voice feature and the voice data in the data store;
    and thereafter further comprising:
    comparing the first and second user identity data with the processor to determine if such data corresponds to a single user; and
    enabling operation of a transaction function device on the machine when the first and second identity data corresponds to a single user.

19. The method according to claim 18 wherein the storing step further comprises:
   storing in the data store:
   user preference data for each of a plurality of users; and product offering data corresponding to products available for purchase;
   and if in the comparing step the first and second identity data corresponds to a single user, further comprising the steps of:
   selecting products in said product offering data responsive to the user preference data for the single user; and
   outputting through an output device on the machine information corresponding to the selected products.

20. The method according to claim 18 wherein the storing step further comprises storing for each of a plurality of users manual input data, and wherein if in the comparing step the first and second identity data do not correspond to a single user, and before the enabling step further comprising the steps of:
   prompting the user through an output device at the machine to make an input through a manually actuatable input device on the machine; and
   further comparing the data input by the user through the input device to manual input data in the data store, wherein correspondence of the data resolves the identity of a single user.

21. The method according to claim 18 wherein the storing step comprises prompting a user through an input terminal to provide at least one of the image data or voice data.

22. The method according to claim 19 wherein the storing step comprises prompting a user through an input terminal to provide user preference data.

23. The method according to claim 18 wherein the financial transaction machine further includes a sensing device wherein the sensing device enables sensing the user in proximity to the machine, and further comprising the step of preventing operation of the transaction function device responsive to the user ceasing to be sensed in proximity to the machine.

24. Apparatus comprising:
   (a) a transaction machine including a characteristic input device for sensing at least one of a physical or vocal feature of a user adjacent the machine, a manual input device, and a transaction function device;
   a processor in operative connection with a data store, the processor in operative connection with the characteristic input device and the manual input device, and wherein the data store includes for each of a plurality of authorized users, feature data representative of the feature associated with the user, and input data associated with a manual input corresponding to the user, and wherein the processor is operative to determine if feature data input through the characteristic input device by a user in proximity to the machine corresponds to feature data associated with one of the plurality of authorized users, and if so to enable operation of the transaction function device; and if not, to determine if the manual input by the user through the manual input device on the machine corresponds to the input data associated with one of the plurality of authorized users and if so to enable operation of the transaction function device.

25. The apparatus according to claim 24 wherein the feature data includes data representative of both physical and vocal features of a plurality of authorized users, and wherein the feature of the user at the machine must correspond to both the physical and vocal data of one authorized user, and wherein upon such correspondence the transaction function device is enabled to be operated.

26. The apparatus according to claim 25 wherein the manual input device includes a card reader, whereby the card reader reads a card including identifying card data corresponding to a user.

27. The apparatus according to claim 26 wherein the manual input device further includes a keypad, wherein the user is enabled to input a code corresponding to the user through the keypad, and wherein the transaction function device is enabled to be operated when the code and the identifying card data both correspond to the authorized user.

28. The apparatus according to claim 24 wherein the machine includes an audio output device, and wherein the audio output device is in operative connection with the processor, wherein the processor operates the audio output device to prompt the user to provide an input.

29. The apparatus according to claim 28 and further comprising a suppression input device, wherein the user is selectively enabled to suppress operation of the audio output device, whereby a user is enabled to selectively conduct a silent transaction.

30. The apparatus according to claim 29 wherein the processor is operative responsive to selection of the suppression device to store feature data concerning the user in the data store.

31. Apparatus comprising:
   a transaction machine wherein the machine includes an imaging device providing image input signals, and an audio input device providing audio input signals, and at least one dispenser device, whereby a user adjacent to the machine causes image input signals to be generated and the voice of the user causes audio input signals to be generated;
   a processor, the processor in operative connection with the imaging device, the audio input device and the dispenser device, the processor also being in operative connection with a data store, wherein the data store includes data corresponding to a plurality of users, the user data for each user including identity data corresponding to the user, image data corresponding to an appearance feature of the user, and voice data corresponding to a voice feature of the user;
   wherein the processor is operative responsive to the image input signals to resolve first identity data, and the processor is operative responsive to the audio input signals to resolve second identity data, and wherein the processor is operative to compare the first and second identity data for a level of correlation and to enable operation of the dispenser device when the level of correlation is reached.

32. Apparatus comprising:
   a transaction machine wherein the machine includes an imaging device providing image input signals, and an audio input device providing audio input signals, and at least one dispenser device, whereby a user adjacent to the machine causes image input signals to be generated and the voice of the user causes audio input signals to be generated;
   a processor, the processor in operative connection with the imaging device, the audio input device and the dispenser device, the processor also being in operative connection with a data store, wherein the data store includes stored user data corresponding to a plurality of users, the user data for each user including identity data corresponding to the user, image data corresponding to an appearance feature of the user, and voice data corresponding to a voice feature of the user;

wherein the processor is operative responsive to the stored user data for a plurality of users and the image input signals to resolve first identity data, and the processor is operative responsive to the stored user data for a plurality of users and the audio input signals to resolve second identity data, and wherein the processor is operative to compare the first and second identity data for a level of correlation and to enable operation of the dispenser device when the level of correlation is reached.

33. Apparatus comprising:

a transaction machine wherein the machine includes an imaging device providing image input signals, and an audio input device providing audio input signals, and at least one dispenser device, whereby a user adjacent to the machine causes image input signals to be generated and the voice of the user causes audio input signals to be generated;

a processor, the processor in operative connection with the imaging device, the audio input device and the dispenser device, the processor also being in operative connection with a data store, wherein the data store includes stored user data corresponding to a plurality of authorized users, the user data for each user including image data corresponding to an appearance feature of the user and voice data corresponding to a voice feature of the user;

wherein the processor is operative responsive to the image input signals, the audio input signals and the stored user data for a plurality of users, to resolve identity data, and where when the resolved identity data corresponds to one of the authorized users the processor enables operation of the dispenser device.

34. Apparatus comprising:

a transaction machine, wherein the machine includes an imaging device providing image input signals, and an audio input device providing audio input signals, and at least one output device, whereby a user adjacent to the machine causes image input signals to be generated and the voice of the user causes audio input signals to be generated;

a processor, the processor in operative connection with the imaging device, the audio input device and the output device, the processor also being in operative connection with a data store, wherein the data store includes data corresponding to a plurality of users, the user data for each user including identity data corresponding to the user, image data corresponding to an appearance feature of the user, voice data corresponding to a voice feature of the user and user preference data associated with the user, the data store further including product offering data representative of products available for purchase;

wherein the processor is operative responsive to the image input signals and the audio input signals to resolve user identity data corresponding to a particular user, and wherein the processor is operative responsive to the user preference data corresponding to the particular user to select product offering data in the data store and to operate the output device to provide at least one output responsive to the selected product offering data.

35. Apparatus comprising:

a transaction machine wherein the machine includes at least one of an imaging device providing image input signals or an audio input device providing audio input signals, the machine further including at least one output device;

a processor, the processor in operative connection with the at least one imaging device or audio input device, and the output device, the processor also being in operative connection with a data store, wherein the data store includes user data corresponding to a plurality of users, the user data for each user including identity data corresponding to the user, user preference data associated with the user, and at least one of image data corresponding to an appearance feature of the user or voice data corresponding to a voice feature of the user, the data store further including product offering data representative of products available for purchase;

wherein the processor is operative responsive to at least one of the image input signals or the audio input signals, and the stored user data, to resolve user identity data corresponding to a particular user, and wherein the processor is operative responsive to the preference data associated with the particular user to select product offering data in the data store and to cause the output device to provide at least one output responsive to the selected product offering data.

36. Apparatus comprising:

a transaction machine wherein the machine includes at least one of an imaging device providing image input signals or an audio device providing audio input signals, the machine farther including at least one dispenser device and a proximity sensor for sensing a user adjacent to the machine;

a processor, wherein the processor is in operative connection with the at least one imaging device or audio input device, and wherein the processor is further in operative connection with the transaction function device, the proximity sensor and a data store, wherein the data store includes for each of a plurality of authorized users, at least one of image data corresponding to an appearance feature of the user or voice data corresponding to a voice feature of the user; and wherein the processor is operative responsive to at least one of the image signals or audio signals to determine if a user causing the image or audio signals to be generated is an authorized user, and if so, and provided the user is sensed by the proximity sensor as remaining in proximity to the machine, to enable operation of the dispenser device.

* * * * *

UNITED STATES PATENT AND TRADEMARK OFFICE
CERTIFICATE OF CORRECTION

PATENT NO : 6,023,688
DATED : February 8, 2000
INVENTOR(S) : Natarajan Ramachandran, et al.

It is certified that error appears in the above-identified patent and that said Letters Patent is hereby corrected as shown below:

Column 22, line 41, change "farther" to --further--

Signed and Sealed this

Sixth Day of February, 2001

Attest:

Q. TODD DICKINSON

Attesting Officer

Director of Patents and Trademarks